(12) United States Patent
Atanassov et al.

(10) Patent No.: US 8,339,475 B2
(45) Date of Patent: Dec. 25, 2012

(54) HIGH DYNAMIC RANGE IMAGE COMBINING

(75) Inventors: Kalin M. Atanassov, San Diego, CA (US); Ruben M. Velarde, Chula Vista, CA (US); Hsiang-Tsun Li, San Diego, CA (US); Hau Hwang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 667 days.

(21) Appl. No.: 12/340,474

(22) Filed: Dec. 19, 2008

(65) Prior Publication Data

US 2010/0157078 A1    Jun. 24, 2010

(51) Int. Cl.
*H04N 5/235* (2006.01)
*G06K 9/40* (2006.01)

(52) U.S. Cl. .................................. 348/229.1; 382/274

(58) Field of Classification Search ............... 348/222.1, 348/229.1, 230.1, 255, 256; 382/274, 284
See application file for complete search history.

(56) References Cited

U.S. PATENT DOCUMENTS

| | | | |
|---|---|---|---|
| 5,181,118 A | 1/1993 | Kimura | |
| 5,402,171 A | 3/1995 | Tagami et al. | |
| 5,450,502 A | 9/1995 | Eschbach et al. | |
| 5,519,441 A | 5/1996 | Gusmano et al. | |
| 5,647,360 A | 7/1997 | Bani-Hashemi et al. | |
| 5,690,106 A | 11/1997 | Bani-Hashemi et al. | |
| 5,801,773 A * | 9/1998 | Ikeda | 348/229.1 |
| 5,963,653 A | 10/1999 | McNary et al. | |
| 6,298,144 B1 | 10/2001 | Pucker, II et al. | |
| 6,416,477 B1 | 7/2002 | Jago | |
| 6,813,040 B1 | 11/2004 | Uchino et al. | |
| 6,879,731 B2 | 4/2005 | Kang et al. | |
| 7,120,293 B2 | 10/2006 | Schoelkopf et al. | |
| 7,133,070 B2 | 11/2006 | Wheeler et al. | |
| 7,271,937 B2 | 9/2007 | Schrey et al. | |
| 7,295,232 B2 | 11/2007 | Washisu | |
| 7,315,325 B2 | 1/2008 | Soupliotis et al. | |

(Continued)

FOREIGN PATENT DOCUMENTS

EP          1313066 A1    5/2003

(Continued)

OTHER PUBLICATIONS

Cvetkovic Set al: "Tone-mapping functions and multiple-exposure techniques for high dynamic-range images"IEEE Transactions on Consumer Electronics, IEEE Service Center, New York, NY, US LNKD-DO1:10.1109/TCE.2008.4560177, vol. 54, No. 2, May 1, 2008, pp. 904-911, XP0112299821SSN: 0098-3063.*

(Continued)

*Primary Examiner* — Kelly L Jerabek
(74) *Attorney, Agent, or Firm* — James R. Gambale, Jr.

(57) ABSTRACT

Systems and methods of high dynamic range image combining are disclosed. In a particular embodiment, a device includes a global mapping module configured to generate first globally mapped luminance values within a region of an image, a local mapping module configured to generate second locally mapped luminance values within the region of the image, and a combination module configured to determine luminance values within a corresponding region of an output image using a weighted sum of the first globally mapped luminance values and the second locally mapped luminance values. A weight of the weighted sum is at least partially based on a luminance variation within the region of the image.

31 Claims, 12 Drawing Sheets

U.S. PATENT DOCUMENTS

| | | | |
|---|---|---|---|
| 2005/0013501 | A1* | 1/2005 | Kang et al. ............... 382/254 |
| 2005/0117799 | A1 | 6/2005 | Fuh et al. |
| 2006/0192878 | A1 | 8/2006 | Miyahara et al. |
| 2006/0274156 | A1 | 12/2006 | Rabbani et al. |
| 2006/0275745 | A1 | 12/2006 | Schwarz |
| 2007/0014480 | A1 | 1/2007 | Sirohey et al. |
| 2007/0242900 | A1 | 10/2007 | Chen et al. |
| 2007/0269132 | A1 | 11/2007 | Duan et al. |
| 2008/0063294 | A1 | 3/2008 | Burt et al. |
| 2008/0094486 | A1* | 4/2008 | Fuh et al. ............... 348/229.1 |
| 2009/0102945 | A1* | 4/2009 | Chen ................... 348/229.1 |
| 2009/0174795 | A1* | 7/2009 | Kato et al. ............... 348/234 |
| 2010/0157079 | A1 | 6/2010 | Atanassov et al. |

FOREIGN PATENT DOCUMENTS

| | | |
|---|---|---|
| EP | 1507234 A1 | 2/2005 |
| EP | 1615169 A2 | 1/2006 |
| EP | 1857975 A2 * | 11/2007 |
| EP | 1857975 A2 | 11/2007 |

OTHER PUBLICATIONS

Larson G W et al: "A Visibility Matching Tone Reproduction Operator for High Dynamic Range Scenes"IEEE Transactions on Visualization and Computer Graphics, IEEE Service Center, Los Alamitos, CA, US LNKD-DOI:IO.1109/2945.646233, vol. 3, No. 4, Oct. 1, 1997, pp. 291-306, XP0007309651SSN: 1077-2626.*

Cvetkovic, et al., "Tone-mapping functions and multiple-exposure techniques for high dynamic-range images" IEEE Transactions on Consumer Electronics, IEEE Service Center, New York, NY, US, LNKD-DOI:10.1109/TCE.2008.4560177, vol. 54, No. 2, May 1, 2008, pp. 904-911, XP011229982.

International Search Report and Written Opinion—PCT/US09/068834, International Search Authority—European Patent Office, May 11, 2010.

Larson, et al, "A Visibility Matching Tone Reproduction Operator for High Dynamic Range Scenes" IEEE Transactions on Visualization and Computer Graphics, IEEE Service Center, Los Alamitos, CA, US LNKD-DOI:10.1109/2945.646233, vol. 3, No. 4, Oct. 1, 1997, pp. 291-306, XP000730965.

Zhao, et al., "Automatic Digital Image Enhancement for Dark Pictures" Acoustics, Speech and Signal Processing, 2006. ICASSP 2006 Proceedings. 2006 IEEE International Conference on Toulouse, France May 14-19, 2006, Piscataway, NJ, USA, IEEE, Jan. 1, 2006, pp. II-953-II-956, XP031100762.

Bogoni L et al: "Pattern-selective color image fusion" Pattern Recognition, Elsevier, GB LNKDDOI: 10.1016/S0031-3203(00)00087-X, vol . 34, No. 8, Aug. 1, 2001 , pp. 1515-1526, XP004362563 ISSN: 0031-3203 figure 1 paragraphs [0002], [3.3], [3.4].

* cited by examiner

HIGH DYNAMIC RANGE IMAGE COMBINING

I. FIELD

The present disclosure is generally related to high dynamic range image combining.

II. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

Digital signal processors (DSPs), image processors, and other processing devices are frequently used in portable personal computing devices that include digital cameras or that display image or video data captured by a digital camera. Such processing devices can be utilized to provide video and audio functions, to process received data, such as captured image data or to perform other functions.

A dynamic range of image data or video data captured by a digital camera indicates a ratio between a highest light level and a lowest light level that can be accurately resolved. A dynamic range of an image may vary with an exposure time of the image. An image may be captured using two different exposure times and the resulting sets of image data may be combined to create a high dynamic range (HDR) image. Although the resulting HDR image may provide enhanced contrast due to the combination of different images with different exposure times, many displays or data transport standards do not support the increased data requirements of the resulting HDR image.

III. SUMMARY

In a particular embodiment, a method is disclosed that includes receiving first image data from an image sensor. The first image data is generated using a first exposure time. The method includes receiving second image data from the image sensor, the second image data generated using a second exposure time that is greater than the first exposure time. The method includes scaling luminance values of the first image data based on a ratio of the second exposure time to the first exposure time to create scaled first image data. The method also includes selectively combining the scaled first image data and the second image data based on an overlap between a first effective dynamic range of the scaled first image data and a second effective dynamic range of the second image data to generate a high dynamic range (HDR) image. The method also includes generating a tone mapping to compress a dynamic range of the HDR image. Generating the tone mapping includes determining a pixel-by-pixel weighting of a global tone mapping value and a local tone mapping value based on a luminance variation within a neighborhood of each pixel of the HDR image. The method further includes providing a tone mapped image having the compressed dynamic range of the HDR image to be displayed at a display device.

In another embodiment, a method is disclosed that includes adjusting first luminance values of first image data based on a luminance distribution of the first image data to generate second image data. The method also includes adjusting second luminance values of a region of the second image data based on a local luminance distribution of the region of the second image data to generate locally adjusted image data. The method further includes generating third image data that has a smaller dynamic range than the first image data. Luminance values of the third image data corresponding to the region of the second image data are determined by combining the locally adjusted image data and the second image data within the region of the second image data based on a luminance variation of the second image data within the region.

In another embodiment, a wireless device is disclosed that includes a processor and a memory accessible to the processor. The wireless device also includes a camera and a display device. The processor is configured to generate tone mapped image data including a tone mapped pixel value of each particular pixel of a plurality of pixels of image data based on a luminance variation within a neighborhood of the particular pixel. The image data corresponds to an image capture at the camera. The processor is also configured to provide the tone mapped image data for display at the display device.

In another embodiment, an apparatus is disclosed that includes means for generating tone mapped image data including a tone mapped pixel value of each particular pixel of a plurality of pixels of image data based on a luminance variation within a neighborhood of the particular pixel. The image data corresponds to an image captured at a camera. The apparatus also includes means for providing the tone mapped image data for display.

In another embodiment, a device is disclosed that includes a global mapping module configured to generate first globally mapped luminance values within a region of an image. The device also includes a local mapping module configured to generate second locally mapped luminance values within the region of the image. The device further includes a combination module configured to determine luminance values within a corresponding region of an output image using a weighted sum of the first globally mapped luminance values and the second locally mapped luminance values. A weight of the weighted sum is at least partially based on a luminance variation within the region of the image.

In another embodiment, a computer readable medium is disclosed that includes executable instructions that, when executed, cause a processor to receive first image data and to generate second image data based on a luminance distribution of the first image data. The executable instructions, when executed, cause the processor to generate locally adjusted image data based on a local luminance distribution within a region of the second image data and to generate third image data that has a smaller dynamic range than the first image data. Luminance values of a region of the third image data corresponding to the region of the second image data are determined by combining the locally adjusted image data and the second image data based on a luminance variation of the second image data within the region of the second image data.

One particular advantage provided by embodiments of high dynamic range image combining is enhanced contrast images that are compatible with lower dynamic range image transport and display mechanisms.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
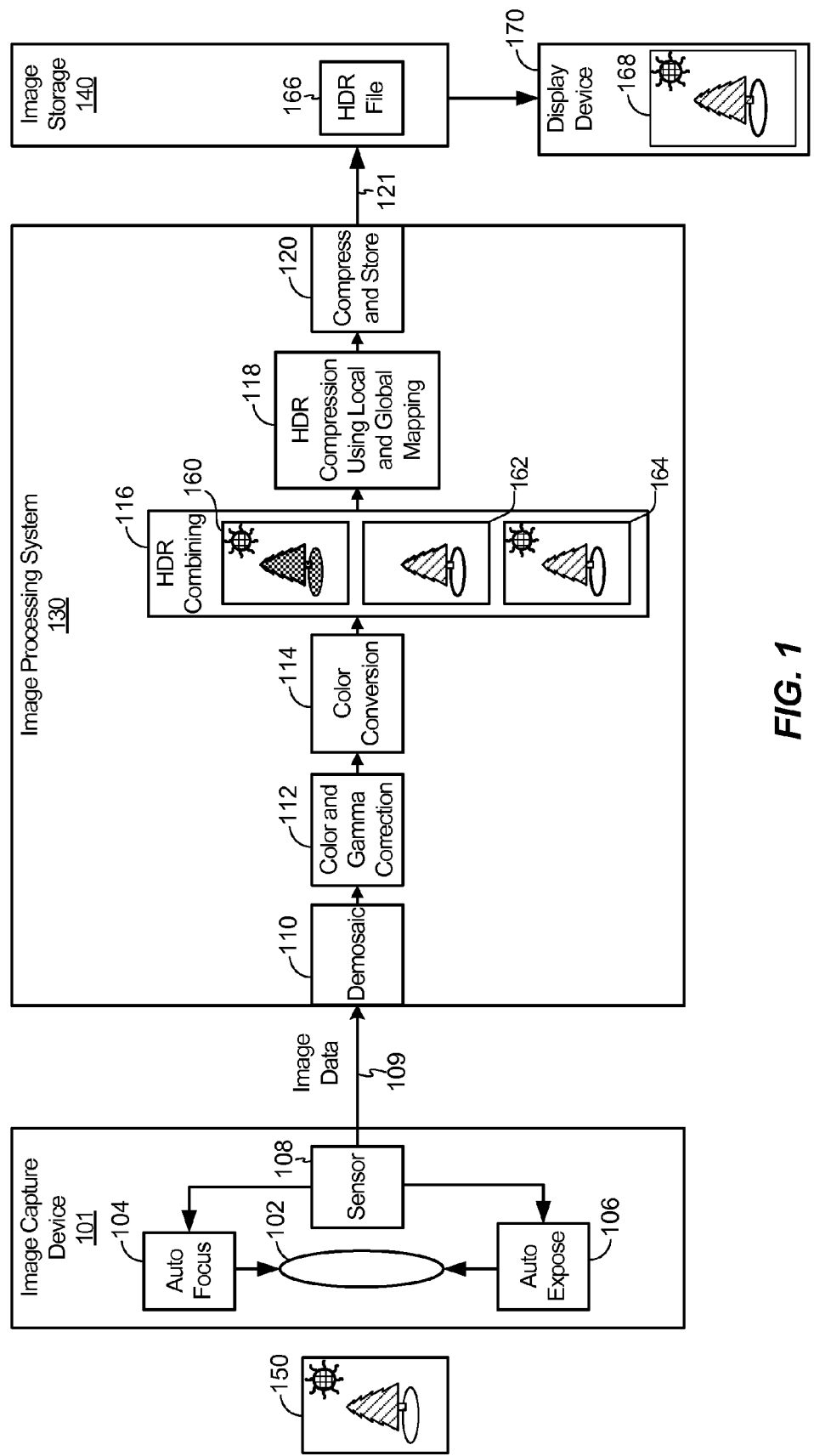
FIG. 1 is a block diagram of a particular illustrative embodiment of a system including an image processing system having a high dynamic range (HDR) combining module and a HDR compression module.

FIG. 1 is a block diagram of a particular illustrative embodiment of a system including an image processing system having a high dynamic range (HDR) combining module and a HDR compression module using local and global mapping. The system 100 includes an image capture device 101 coupled to an image processing system 130. The image processing system 130 is coupled to an image storage device 140 and a display device 170. The image processing system 130 is configured to receive multiple sets of image data 109 from the image capture device 101 using different exposure times and to create a HDR image that is compatible with low dynamic range (LDR) transport, storage, and display mechanisms. Generally, the system 100 may be implemented in an electronic device that is configured to perform real-time image processing using relatively limited processing resources.

In a particular embodiment, the image capture device 101 is a camera, such as a video camera or a still camera. The image capture device 101 includes a lens 102 that is responsive to a focusing module 104 and to an exposure module 106. A sensor 108 is coupled to receive light via the lens 102 and to generate the image data 109 in response to an image received via the lens 102. The focusing module 104 may be responsive to the sensor 108 and may be adapted to automatically control focusing of the lens 102. The exposure module 106 may also be responsive to the sensor 108 and may be adapted to control an exposure of the image and to vary exposures of multiple images to be combined into a HDR image. In a particular embodiment, the sensor 108 includes multiple detectors, or pixel wells, that are arranged so that adjacent detectors detect different colors of light. For example, received light may be filtered so that each detector receives red, green, or blue incoming light.

The image capture device 101 is coupled to provide the image data 109 to the image processing system 130. The image processing system 130 includes a demosaic module 110 to perform a demosaic operation on image data 109 received from the sensor 108. A color and gamma correction module 112 is configured to perform color correction on demosaiced image data and to generate gamma corrected image data. A color conversion module 114 is coupled to perform a color space conversion to the gamma corrected image data.

The image processing system 130 also includes a high dynamic range (HDR) combination module 116 and a HDR compression module using local and global mapping 118. The HDR combination module 116 is configured to combine a first low dynamic range image 160 that is captured using a shortened exposure time with a second low dynamic range image 162 that is captured using a longer exposure time. The low dynamic range (LDR) images 160 and 162 are combined to form a high dynamic range image 164. The HDR compression module using local and global mapping 118 is configured to compress the high dynamic range image 164 to a bit range compatible with a transport layer, such as a Joint Photographic Experts Group (JPEG) encoding, or a display device, such as the display device 170. Illustrative embodiments of HDR combining and HDR compression using local and global mapping are described with respect to FIGS. 2-10.

A compress and store module 120 is coupled to receive an output of the HDR compression module 118 and to store output data at the image storage device 140 as a compressed HDR file 166. For example, the compress and store module 120 may be configured to use JPEG encoding to encode the output of the HDR compression module 118 to be stored. The image storage device 140 may include any type of storage medium, such as one or more display buffers, registers, caches, flash memory elements, hard disks, any other storage device, or any combination thereof. The image storage device 140 may be accessible to the display device 170 so that the compressed HDR file 166 is retrievable for display as a HDR image 168 at the display device 170.

During operation, the system 100 may perform at least two image capture operations of a representative image 150. The image 150 includes a bright region, illustrated as the sun, as well as a dark region, illustrated as a shadow of a tree. The low dynamic range image 160 may include image data that is captured in response to a shortened exposure time at the sensor 108. The shortened exposure time may enable the sensor 108 to capture details within the brighter regions of the image 150. For example, the shortened exposure time may prevent saturation of sensor pixels in the region of the sun with a result that detail of darker areas such as the shadow of the tree may not be captured. On the other hand, the second low dynamic range image 162 may include image data captured by the sensor 108 at a longer exposure time, such as twice the exposure time of the image 160. The longer exposure time enables the sensor 108 to capture detail of the darker portions of the image 150 but causes pixels of the sensor 108 in the vicinity of the bright regions to saturate.

As a result, the first LDR image 160 may provide contrast among the bright areas but not the darker areas, while the second LDR image 162 may provide contrast in the darker areas but the bright areas may appear washed out or indistinct. By combining the low dynamic range images 160 and 162 to create the high dynamic range image 164, the image processing system 130 enables image data to include details in the bright areas around the sun and also in the darker areas around the shadow of the tree. However, the resultant HDR image 164 may require substantially more information than may be supported by a transport layer, such as a JPEG layer, or by a display device, such as the display device 170. For example, where both of the low dynamic range images 160 and 162 may represent pixel luminance values as 8-bit values, e.g., having a range from 0-255, the HDR image 164 may represent pixel luminance values using a 16-bit value, e.g. to accommodate a range from 0-65,535. However, the display device 170 may only support an 8-bit luminance value per pixel. Therefore, 16-bit luminance values of the HDR image 164 are compressed to 8-bit values to be displayable at the display device 170.

The HDR compression module 118 compresses the HDR image 164 using both local tone mapping and global tone mapping. For example, global tone mapping may be used to reduce a large number of luminance values of a high dynamic range image to a smaller number of luminance values based on a distribution of luminance values throughout the entire HDR image 164. However, the global tone mapping may be sub-optimal in any particular region of the HDR image 164. For example, a global tone mapping may not provide a large enough dynamic range for both the bright area around the sun and the shaded area at the base of the tree. On the other hand, local tone mapping may logically divide a high dynamic range image into multiple regions and selectively map pixel luminance values to a reduced range of luminance values on a region-by-region basis. Thus, local tone mapping may enable a more locally effective mapping of dynamic range to the reduced range of luminance values but may result in a loss of uniformity across the multiple regions of the image.

The HDR compression module 118 may perform a global tone mapping and also a local tone mapping based on received HDR image data and select the local tone mapping, the global tone mapping, or a weighted combination of the local tone mapping and the global tone mapping on a pixel-by-pixel basis. For example, when a pixel under consideration is in an area of high variation of luminance values, the HDR compression module 118 may select a larger weighting of the local mapping to provide a larger dynamic range of luminance values in the region of the pixel. In contrast, where there is not a significant amount of luminance variation in the neighborhood of the particular pixel, the HDR compression module 118 may select a larger weighting of the global tone mapping for greater uniformity throughout the image.

By combining the one or more low dynamic range images 160, 162 using different exposure values, and then compressing the resulting HDR image 164 using both local and global tone mappings, the system 100 enables image generation that provides effectively greater dynamic range in the regions of interest while preserving compatibility with lower dynamic range technologies. In addition, by selectively combining local tone mapped pixel values and global tone mapped pixel values to compress the HDR image 164 to a smaller range of luminance values, an appropriate mapping technique or a blend of mapping techniques can be selected based on particular image characteristics, and the selection of mapping techniques may be varied throughout the image as the image characteristics vary.

Although in the particular embodiment illustrated in FIG. 1 the image capture device 102 is illustrated as having a single sensor 108, in other embodiments the image capture device 102 may have multiple sensors. For example, the image capture device 102 may have two or more sensors configured to perform multiple concurrent image captures of a particular scene using different exposure settings to provide the LDR images 160 and 162. In an embodiment having multiple sensors, the sensors need not be identical and may instead have different properties.

Figure 2:
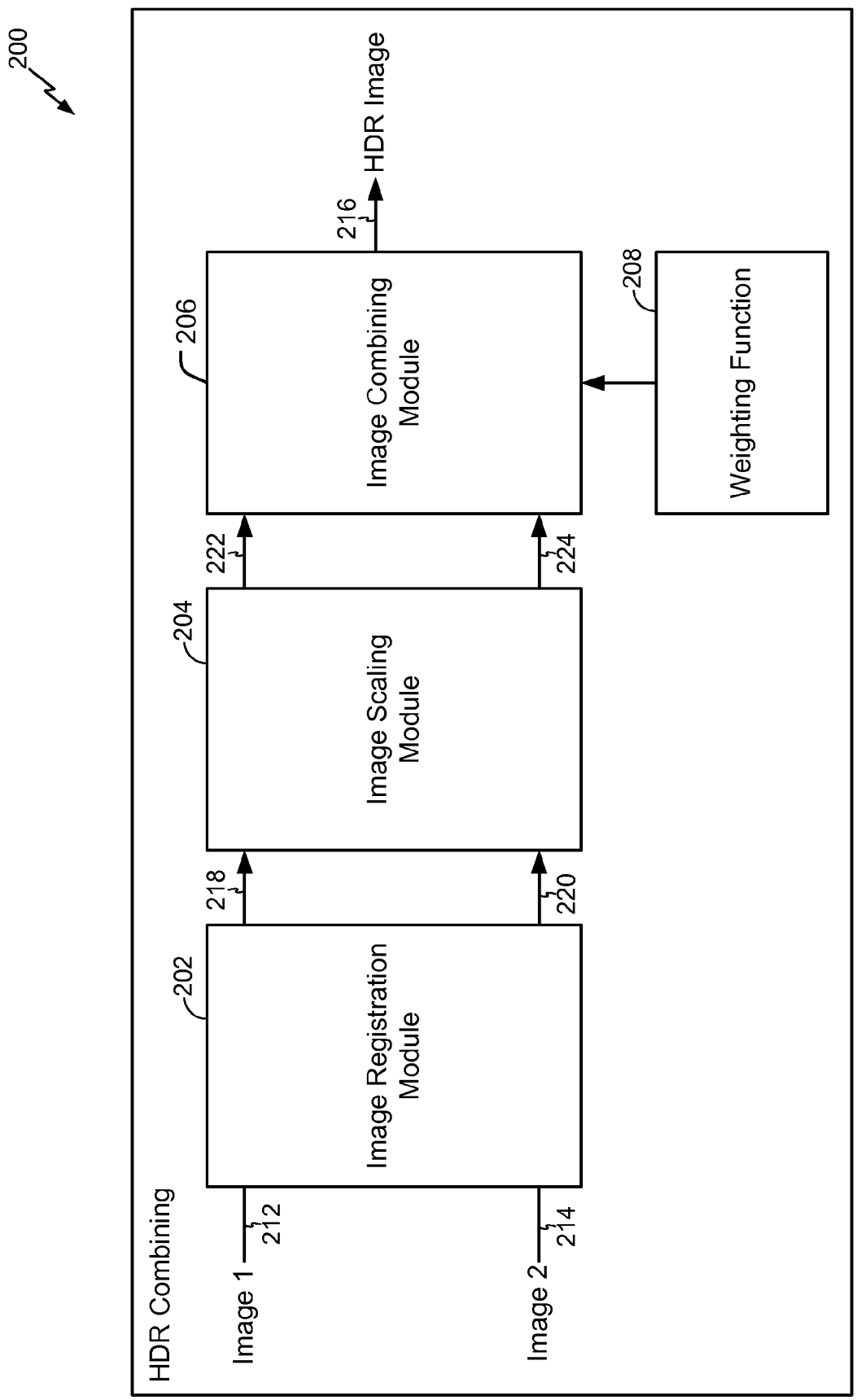
FIG. 2 is a block diagram of a first illustrative embodiment of a high dynamic range image combining system.

Referring to FIG. 2, a first illustrative embodiment of a high dynamic range (HDR) image combining system is depicted and generally designated 200. The system 200 includes an image registration module 202, an image scaling module 204, an image combining module 206, and a weighting function 208. The system 200 combines first image data 212 and second image data 214 to generate HDR image data 216. In an illustrative embodiment, the system 200 may be included in the HDR combining module 116 of FIG. 1.

The first image data 212 may include an output of an image sensor corresponding to an image using a first exposure time, while the second image data 214 may include an output of the same image sensor (or another image sensor) corresponding to the image using a second exposure time. For example, the first image data 212 may be exposed using an exposure time of N, while the second image data 214 may be exposed using an exposure time of 1.5N, 2N, 4N, or any other integer or non-integer multiple of N.

In a particular embodiment, the image registration module 202 is configured to receive the first image data 212 and the second image data 214. The image registration module 202 may be configured to determine one or more offsets to the first image data 212 and the second image data 214 to enable an accurate registration of the images to generate first aligned image data 218 and second aligned image data 220. For example, the first image data 212 may be offset from the second image data 214 due to movement of the camera, such as by a hand shake or other camera motion or movement of objects within the image. The image registration module 202 may be adapted to determine one or more motion vectors corresponding to regions or pixels of the image data 212 and 214. The motion vectors enable at least one of the first image data 212 and the second image data 214 to be adjusted so that corresponding portions of each image are located at substantially the same pixel locations of each image in the first aligned image data 218 and the second aligned image data 220.

The image scaling module 204 is configured to modify an intensity of various pixel levels of one or more of the aligned image data 218 and 220 to generate first scaled image data 222 and second scaled image data 224. For example, if the second aligned image data 220 has an exposure time equal to twice that of the first aligned image data 218, luminance values corresponding to each pixel of the first aligned image data 218 may be adjusted to compensate for an approximate amount of light the pixel would have received had it been exposed for the same amount of time as the second aligned image data 220. Also, scaling of luminance values may be estimated on the fly. In a particular embodiment, one result of scaling the luminance values of the first aligned image data 218 is that a range of scaled luminance values of the first aligned image data 218 may exceed an available number of luminance values in a low dynamic range image data format. Therefore, the first scaled image data 222 may be represented using a larger number of data bits for each pixel than the first image data 212.

In a particular embodiment, the image scaling module 204 is configured to scale only one of the first aligned image data 218 or the second aligned image data 220 based on relative exposure times of the first and second images to generate the first scaled image data 222 and the second scaled image data 224. However, in other embodiments one or both of the first aligned image data 218 and the second aligned image data 220 may be adjusted.

In a particular embodiment, the image combining module 206 may be configured to receive the scaled image data 222 and 224 from the image scaling module 204 and to combine the received scaled image data to produce the high dynamic range image data 216. In a particular embodiment, the image combining module 206 may receive the first scaled image data 222 corresponding to a shorter exposure time, such as the image data 212 scaled by the image scaling module 204. In addition, the image combining module 206 may receive the second scaled image data 224, which may or may not have been scaled by the image scaling module 204. The image combining module 206 may include internal logic or other decision circuitry to determine for each particular pixel of the HDR image data 216 whether to include values corresponding to the first scaled image data 222, the second scaled image data 224, or a combination of both.

In a particular embodiment, the image combining module 206 is configured to receive one or more values from the weighting function 208. The weighting function 208 may include one or more conditions or values to enable the image combining module 206 to selectively combine the first scaled image data 222 and the second scaled image data 224 to produce the HDR image data 216. For example, the weighting function 208 may include a representation of one or more step functions, one or more sigmoid functions, or one or more other functions to blend, distinguish, or otherwise determine or select pixel values of the HDR image data 216 from the first scaled image data 222 and the second scaled image data 224. To illustrate, a metric such as a luminance variation within a region of a pixel may be determined from the scaled image data 222 and/or 224 and provided to the weighting function 208. The weighting function 208 may return a value that indicates a scaling factor to be applied to a value of the pixel in the first scaled image data 222 and/or a value of the pixel in the second scaled image data 224, prior to adding the value of the pixel in the first scaled image data 222 to a value of the pixel in the second scaled image data 224 to generate the pixel value in the HDR image data 216.

Figure 3:
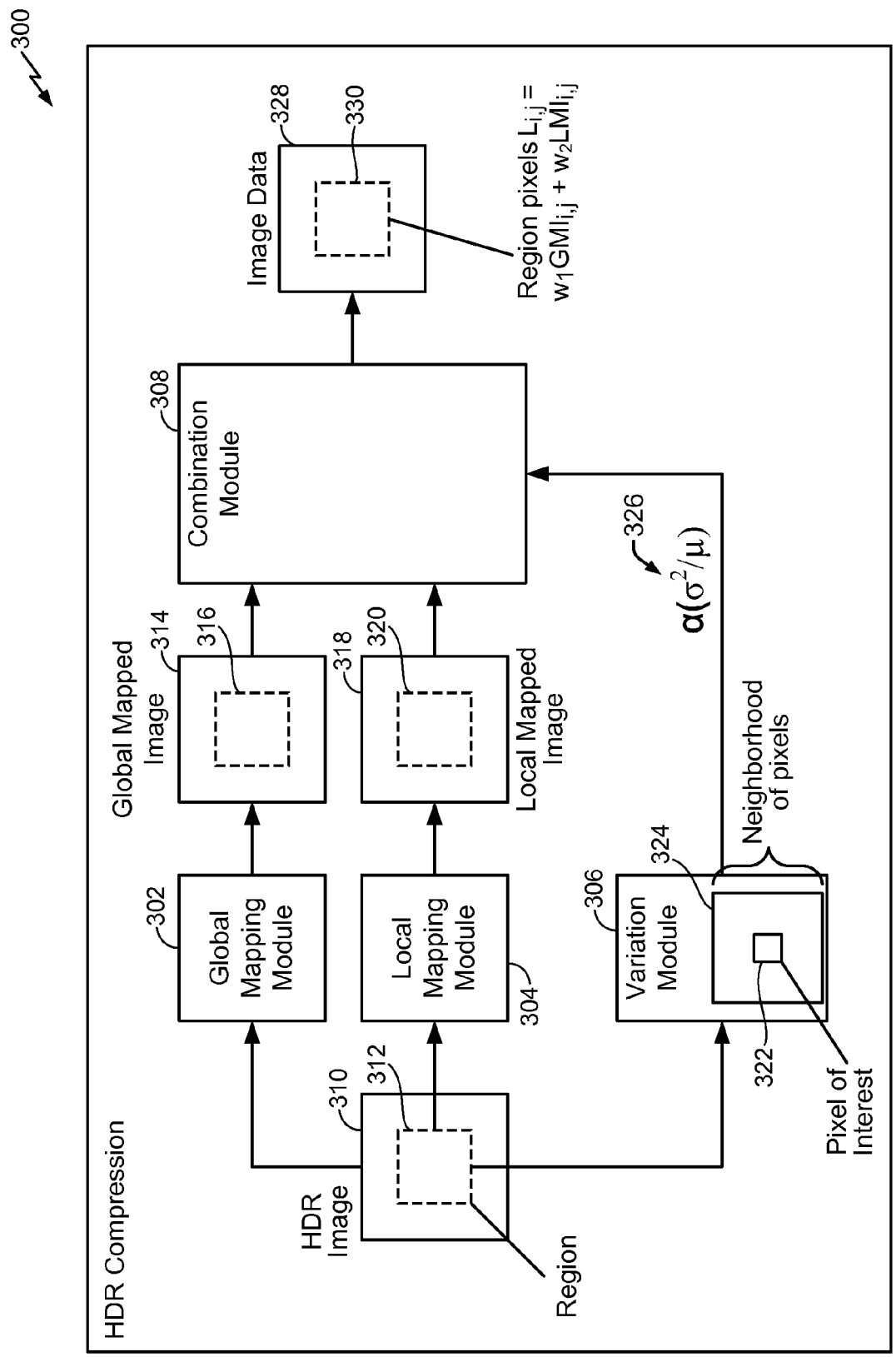
FIG. 3 is a block diagram of a second illustrative embodiment of a high dynamic range image combining system.

Referring to FIG. 3, a second illustrative embodiment of a high dynamic range (HDR) image combining system is depicted and generally designated 300. The system 300 includes a global mapping module 302, a local mapping module 304, a variation module 306, and a combination module 308. The global mapping module 302, the local mapping module 304, and the variation module 306 are each responsive to HDR image data, and each provide an output to the combination module 308. In a particular embodiment, the combination module 308 generates output image data 328 having a high dynamic rage with luminance values represented using fewer bits than input image data. In an illustrative embodiment, the system 300 is included in the HDR compression module 118 of FIG. 1.

In a particular embodiment, high dynamic range image data 310 is provided to the global mapping module 302. The high dynamic range image data 310 may include luminance data for one or more pixels of the image, where the luminance data is expressed using a larger range of values than the output image data 328. For example, the HDR image data 310 may include a 16-bit description of each pixel's luminance value, while the output image data 328 may include an 8-bit description of each pixel's luminance value. The global mapping module 302 may be configured to generate one or more histograms of luminance values of pixels of the HDR image data 310 and to map the pixel distribution of the pixel luminance values to a fewer number of luminance values to generate global mapped image data 314. In a particular embodiment, the global mapping module 302 may use a perceptually constrained histogram and may perform histogram equalization. The global mapping module 302 may perform perceptual processing at darker regions such as by using a low pass filter to simulate impaired capability of the eye to resolve details and color saturation decrease to simulate an impaired capability of the eye to see in color.

In a particular embodiment, the local mapping module 304 is configured to receive data corresponding to at least one region 312 of the HDR image data 310 and to generate a local mapped image 318 based on pixel luminance values within the region 312. For example, the local mapping module 304 may apply a similar mapping technique as the global mapping module 302 to a subset of the HDR image data 310 corresponding to the region 312. Alternatively, the local mapping module 304 may apply one or more other mapping techniques to map luminance values corresponding to the region 312 to a reduced number of luminance values. The local mapping module 304 may generate local mapped image data 318, including a region 320 having locally mapped pixel luminance values corresponding to the region 312 of the HDR image data 310.

In a particular embodiment, the global mapped image data 314 and the local mapped image data 318 may be provided to the combination module 308. The combination module 308 may be adapted to receive the globally mapped image data 314 and the local mapped image data 318 and to selectively combine the received image data 314 and 318 based on an output of the variation module 306. For example, in a particular embodiment, the combination module 308 may be configured to select luminance values of the global mapped image data 314, or luminance values from the local mapped image data 318. In another embodiment, the combination module 308 may be configured to apply a first weight to luminance values of pixels of the global mapped image data 314, and a second weight to luminance values of the local mapped image data 318. In the illustrated embodiment, the combination module 308 is configured to determine a first weight to apply to the global mapped image data 314. The first weight may be a value between zero and one. The combination module 308 is further configured to determine a second weight to be applied to the local mapped image data 318. The second weight may be substantially equal to one minus the first weight. Thus, the combination module 308 may be configured to output a weighted sum of the luminance values of the global mapped image data 314 and the luminance values of the local mapped image data 318, as the output image data 328.

In a particular embodiment, the combination module 308 is configured to determine and apply a weight to each of the global mapped image data 314 and the local mapped image data 318 on a region-by-region basis. In another embodiment, the combination module 308 is configured to apply weights on a pixel-by-pixel basis. For example, the output of the variation module 306 that is received at the combination module 308 may include data that enables a pixel-by-pixel determination of a first weighting to apply to corresponding pixels of the global mapped image data 314 and a second weighting to apply to the local mapped image data 318.

In a particular embodiment, the variation module 306 is configured to determine, for each particular pixel of interest 322, a variation in a neighborhood of surrounding pixels 324. For example, the neighborhood of surrounding pixels 324 may include a five-by-five region of pixels around the particular pixel of interest 322. In a particular embodiment, the variation module 306 is configured to determine the variation based on differences in luminance values of the HDR image data 310 within the neighborhood of pixels 324. For example, the variation module 306 may determine, for each particular pixel of interest 322, an output value 326 that is proportional to a standard deviation or variance divided by a mean, or average, of luminance values within the five-by-five neighborhood of pixels 324. The output value of the variance divided by the mean may be scaled by a proportionality factor, designated by a.

In a particular embodiment, the output image data 328 includes a region 330 that corresponds to the region 312 of the HDR image data 310. The region 330 of the output image data 328 includes luminance values of particular pixels, indicated as $L_{i,j}$ having a value equal to a first weighting value, $w_1$, multiplied by a luminance value of a corresponding pixel of a corresponding region 316 of the global mapped image ($GMI_{i,j}$), plus a second weighting value $w_2$, multiplied by a luminance value of a corresponding pixel of the region 320 of the local mapped image ($LMI_{i,j}$)

By selectively combining the global mapped image data 314 with the local mapped image data 318 based on an amount of luminance variation within a region of each particular pixel, the output image data 328 may have improved dynamic range in regions of interest and improved continuity in regions of lesser interest than by selecting only one of the global mapped image or the local mapped image. The output image data 328 may therefore be generated to have at least a same amount of detail as the high dynamic range image data 310. In addition, benefits may result such as a controlled complexity, reduction or elimination of image segmentation, and reduction or elimination of artifacts, as compared to other techniques.

Figure 4:
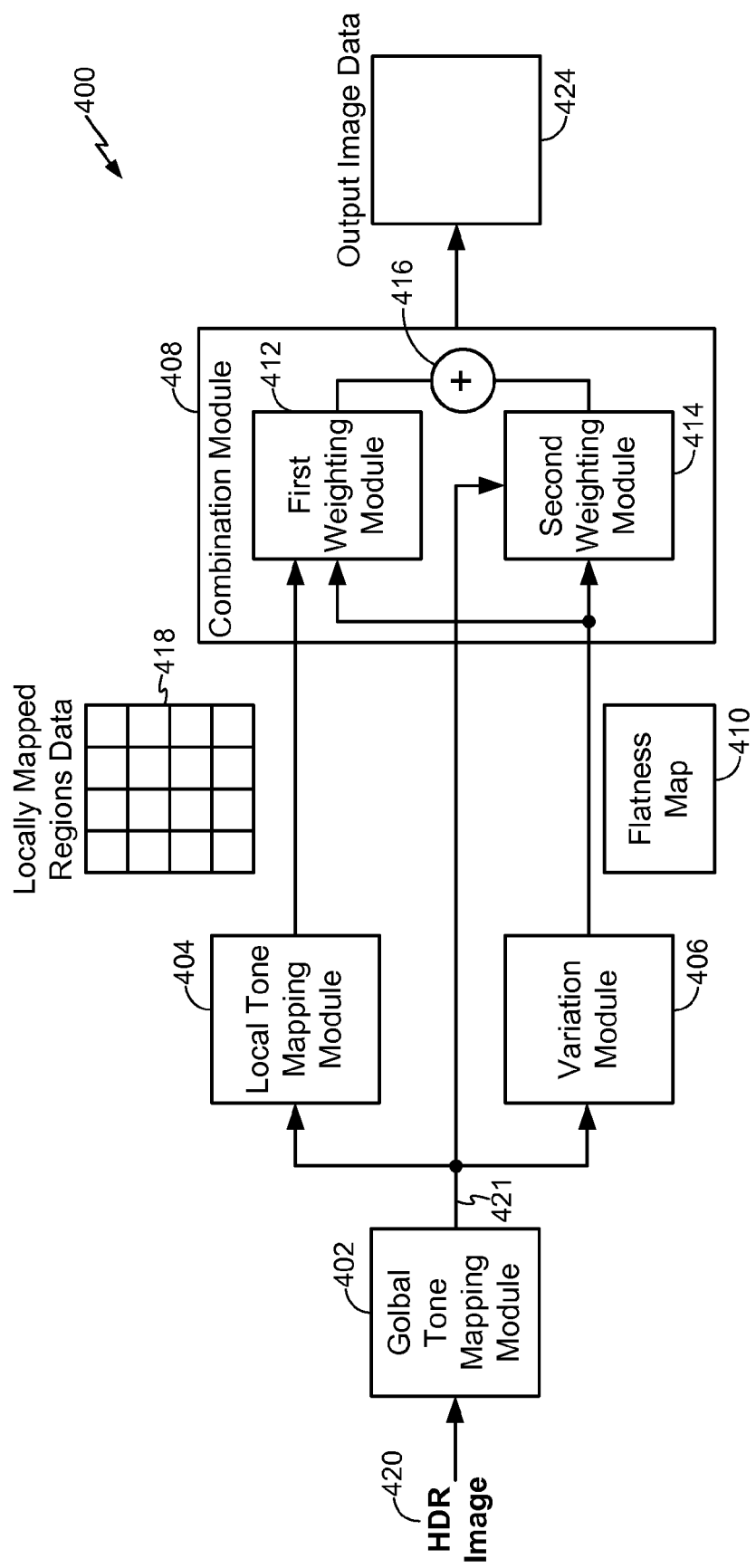
FIG. 4 is a block diagram of a third illustrative embodiment of a high dynamic range image combining system.

Referring to FIG. 4, a third illustrative embodiment of the high dynamic range image combining system is depicted and generally designated 400. The system 400 includes a global tone mapping module 402, a local tone mapping module 404, a variation module 406, and a combination module 408. The global tone mapping module 402 is configured to receive high dynamic range (HDR) image data 420 and to provide global tone mapped image data 421 to each of the local tone mapping module 404, the variation module 406, and the combination module 408. The combination module 408 is configured to receive inputs from the local tone mapping module 404, the global tone mapping module 402, and the variation module 406, and to provide output image data 424. In a particular embodiment, the system 400 may be included in the HDR compression module 118 of FIG. 1.

In a particular embodiment, the global tone mapping module 402 is configured to receive the HDR image data 420 and to perform a global tone mapping that transforms pixel luminance values of the HDR image data 420 into a smaller set of luminance values in global tone mapped image data 421. The global tone mapped image data 421 may include a dynamic range having pixel luminance values selected by a global, or image-wide, distribution of intensity values within the HDR image data 420.

In a particular embodiment, the local tone mapping module 404 is configured to receive the global tone mapped image data 421 and to perform local tone mapping to one or more regions within the global tone mapped image data 421. For example, the local tone mapping module 404 may logically divide the global tone mapped image data 421 into multiple adjacent or overlapping regions and perform a tone mapping to determine a luminance range compression appropriate to one or more of the individual regions. For example, the local tone mapping module 404 may be configured to determine a first appropriate mapping for an upper left most region, followed by a second mapping for a next region, and may traverse substantially all of the global tone mapped image data 421, determining an appropriate mapping for each region. The local tone mapping module 404 may further be configured to modify each locally mapped region, such as via an interpolation technique, using one or more neighbors of the pixels across multiple regions. In this manner, the local tone mapping module 404 may adjust or compensate for differences in similar luminance values being mapped to different bit values from region-to-region in locally mapped regions data 418.

In a particular embodiment, the variation module 406 may be configured to receive the global tone mapped image data 421 and to perform an analysis and output a result based on a variation of luminance values within a determined area of the global tone mapped image data 421. For example, the variation module 406 may be configured to determine, on a pixel-by-pixel basis, a standard deviation, a variance divided by a mean, a difference between highest and lowest luminance values, or any other variation determination, within a neighborhood of each particular pixel.

For example, the variation module 406 may determine a variation within a three-by-three, five-by-five, or other size neighborhood surrounding a particular pixel of interest. Alternatively, or in addition, the variation module 406 may determine one or more values of a variation metric corresponding to one or more regions of the global tone mapped image data 421. For example, the variation module 406 may determine a value of the variation metric corresponding to each region of the locally mapped regions data 418 that are determined by the local tone mapping module 404.

In a particular embodiment, the variation module 406 generates a flatness map 410. The flatness map 410 may include data indicating a "flatness" or amount of luminance variation corresponding to each pixel or pre-determined region of interest. For example, the "flatness" of a particular pixel may be determined as $\alpha$ ($\sigma^2/\mu$) in the neighborhood of the pixel, as described with respect to FIG. 3.

In a particular embodiment, the combination module 408 includes a first weighting module 412 and a second weighting module 414. The first weighting module 412 is responsive to the local tone mapping module 404 and to the flatness map 410 to determine a weight to apply to pixel luminance values of the locally mapped regions data 418. Similarly, the second weighting module 414 is responsive to the global tone mapped image data 421 and to the flatness map 410 to determine a weighting to apply to each pixel luminance value of the global tone mapped image data 421. The combination module 408 also includes adding circuitry 416 to add the weighted pixel luminance value output by the first weighting module 412 to the weighted pixel luminance value output by the second weighting module 414. The output of the adding circuitry 416 is provided to the output image data 424. The output image data 424 may be generated to preserve or enhance a level of detail of the HDR image data 420.

Figure 5:
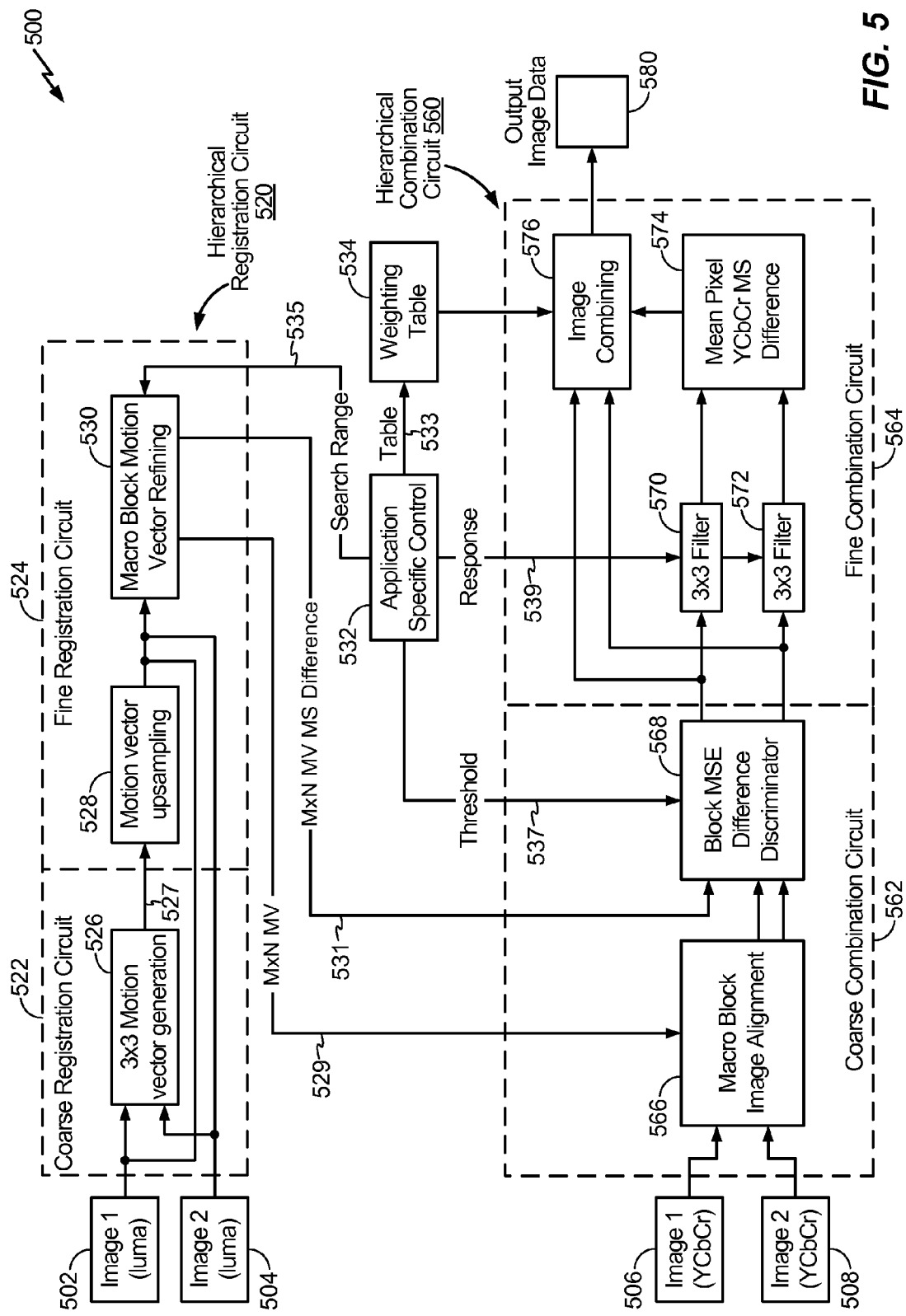
FIG. 5 is a block diagram of an image registration and combination system.

Referring to FIG. 5, a system to selectively combine multiple images is depicted and generally designated 500. In a particular embodiment, the system 500 may be included in the HDR combining module 116 of FIG. 1, the system 200 of FIG. 2, the system 300 of FIG. 3, the system 400 of FIG. 4, any other image processing system, or any combination thereof The system 500 includes a hierarchical registration circuit 520 that is coupled to a hierarchical combination circuit 560. The hierarchical registration circuit 520 and the hierarchical combination circuit 560 are coupled to an application specific control circuit 532. The application specific control circuit 532 and the hierarchical combination circuit 560 are also coupled to a weighting table 534.

The hierarchical registration circuit 520 is configured to receive first image luma data 502 corresponding to a first image and second image luma data 504 corresponding to a second image and to perform a registration process on the first image luma data 502 and the second image luma data 504 using a coarse registration circuit 522 and a fine registration circuit 524. The hierarchical registration circuit 520 is configured to generate a fine set of motion vectors 529 that indicate detected offsets between corresponding portions of the first image luma data 502 and the second image luma data 504. In a particular embodiment, the fine set of motion vectors 529 include magnitude and direction data to align images that may be misaligned due to camera movement, image movement, or both. As illustrated, the hierarchical registration circuit 520 operates on image luma data for computational efficiency. However, in other embodiments, the hierarchical registration circuit 520 may operate using other types of image data, such as chroma component data, red data, blue data, or green data, or any combination thereof, in addition to or in place of luma data.

In a particular embodiment, the coarse registration circuit 522 includes a motion vector generation circuit 526. The motion vector generation circuit 526 may be configured to partition each of the first image luma data 502 and the second image luma data 504 into blocks to perform a coarse registration process between the blocks. For example, the motion vector generation circuit 526 may logically divide each of the first image luma data 502 and the second image luma data 504 into a 3×3 set of overlapping blocks and may use a projection of the overlapping blocks to generate a coarse set of motion vectors 527 that can be applied to align each of the blocks of the second image luma data 504 to a corresponding block of the first image luma data 502. In other embodiments, any number of blocks may be used, and some or all of the blocks may be non-overlapping blocks.

The fine registration circuit 524 is configured to receive the coarse set of motion vectors 527 and to generate a fine set of motion vectors 529. In a particular embodiment, the fine registration circuit 524 includes a motion vector upsampling circuit 528 coupled to a macro block motion vector refining circuit 530. The motion vector upsampling circuit 528 may receive and upsample the coarse set of motion vectors 527 to generate motion vectors having a finer granularity than the coarse set of motion vectors 527. To illustrate, the image luma data 502 and 504 may be configured as M×N arrays of macro blocks, where each macro block corresponds to a sixteen-pixel-by sixteen-pixel region of an image. The motion vector upsampling circuit 528 may generate a M×N set of motion vectors that applies the corresponding motion vector of the coarse set of motion vectors 527 to each macro block.

In a particular embodiment, the macro block motion vector refining circuit 530 is coupled to receive the upsampled set of motion vectors 527 and the image luma data 502 and 504 and to generate a refined set of motion vectors 529. For example, the macro block motion vector refining circuit 530 may be configured to apply each motion vector of the upsampled set of motion vectors 527 to its corresponding macro block of the second image data to coarsely align the macro block of the second image data with a corresponding macro block of the first image data. The macro block motion vector refining circuit 530 may search a region of the first image luma data 502 around the coarsely aligned macro block to determine a more accurate alignment of the coarsely aligned macro block to the first image luma data 502. The search region may be selected based on a search range control signal 535 received from the application specific control circuit 532. The refined set of motion vectors 529 may indicate vector data corresponding to the more accurate alignment of each macro block to enable a macro block-by-macro block registration of the first image luma data 502 and the second image luma data 504.

The macro block motion vector refining circuit 530 may determine the refined set of motion vectors 529 by performing an algorithm that selects a lowest calculated mean square error (MSE) among multiple possible MSEs for each motion vector. For example, for a particular macro block of the second image luma data 504, multiple possible alignments of the macro block with the first image luma data 502 may be considered, and the alignment that results in a lowest computed MSE is selected for the refined set of motion vectors 529. The mean square error determined for each macroblock may be provided to the hierarchical combination circuit 560 as motion vector (MV) means square difference data 531.

In a particular embodiment, the hierarchical combination circuit 560 is configured to combine first image data 506 and second image data 508 using a coarse combination circuit 562 and a fine combination circuit 564. The first image data 506 may include the first luma data 502 for the first image and may also include chroma data for the first image as YCbCr image data. The second image data 508 may include the second luma data 504 for the second image and chroma data for the second image as YCbCr data.

In a particular embodiment, the coarse combination circuit 562 includes a macro block image alignment circuit 566 and a block MSE difference discriminator circuit 568. The macro block image alignment circuit 566 may be configured to apply the refined set of motion vectors 529 to the second image data 508 to generate image data for the second image that is aligned to the first image data. For example, the macro block image alignment circuit 566 may be configured to combine pixel values in the second image when macro blocks are determined to overlap, or to interpolate pixel values where macro blocks are realigned to result in a region of the second image data that is not within any macro blocks. The macro block image alignment circuit 566 may provide the first image data 506 and the aligned image data for the second image to the block MSE difference discriminator circuit 568.

In a particular embodiment, the block MSE difference discriminator circuit 568 is configured to perform a coarse combination process on the data received from the macro block image alignment circuit 566. In particular, the block MSE difference discriminator circuit 568 may eliminate macro blocks of the aligned image data for the second image that do not sufficiently match the first image data 506. For example, the MV MS difference data 531 for each macro block may be compared against a threshold value. When the MS difference exceeds the threshold value for a particular macro block, the particular macro block is determined to be too different between the first image data 506 and the aligned image data for the second image, and thus the image data should not be combined for the particular macro block.

For example, where a moving object appears in a first macro block in the first image data 506 (but not in the first macro block in the aligned image data for the second image) and the moving object appears in a second macro block in the aligned image data for the second image (but not in the second macro block of the first image data 506), the first macro block may be determined to be non-combinable between the first and second images, and the second macro block may determined to be non-combinable between the first and second images, due to the corresponding mean square error differences. The block MSE difference discriminator circuit 568 may be configured to remove each non-combinable macro block from the aligned second image data so that only the pixel values for the macro block from the first image data 506 are used. For example, the pixel values for the macro block may be copied from the first image data 506 to replace the pixel values in the corresponding macro block of the aligned image data for the second image.

As illustrated, the block MSE difference discriminator circuit 568 is responsive to the application specific control circuit 532. For example, the application specific control circuit 532 may provide a threshold control signal 537 that indicates a threshold difference to be used to compare MSE differences between macroblocks of the first image data and the aligned image data for the second image. The block MSE difference discriminator circuit 568 may output two sets of image data to the fine combination circuit 564, including image data corresponding to the first image and image data corresponding to the second image following the coarse combination process.

The fine combination circuit 564 is configured to receive first and second image data that has been registered and coarsely aligned, and to perform a fine combination process to generate output image data 580. In a particular embodiment, the fine combination circuit 564 includes a first filter 570 and a second filter 572 coupled to a mean pixel MS difference circuit 574. The fine combination circuit 564 also includes an image combining circuit 576 coupled to the mean pixel MS difference circuit 574 and to the weighting table 534.

The received data for the first image may be processed by the first filter 570, and the filtered data for the first image is provided to the mean pixel MS difference circuit 574. The received data for the second image may be processed by the second filter 572, and the filtered data for the second image is provided to the mean pixel MS difference circuit 574. The filters 570 and 572 may be responsive to the application specific control circuit 532. For example, the filters 570 and 572 may receive a response control signal 539 from the application specific control circuit 532 that indicates a filter response characteristic, such as a low-pass response, a high-pass response, a bandpass response, any other filter response, or any combination thereof The filters 570 and 572 may include a 3×3 kernel, or any other size kernel. In a particular embodiment, the filters 570 and 572 have a kernel size responsive to the application specific control circuit 532.

The mean pixel MS difference circuit 574 may be configured to receive the filtered data corresponding to each image and to perform a pixel-by-pixel signed mean square difference operation. The difference operation may generate a signed value indicating a difference between the filtered data of the first image and the filtered data of the second image, for each particular pixel, using each of the luma and chroma values for the particular pixel. The mean pixel MS difference circuit 574 may be configured to provide the difference data to the image combining circuit 476.

The image combining circuit 576 may be configured to receive, for each pixel, a difference value from the mean pixel MS difference circuit 574 and to determine a pixel value of each pixel in the output image data 580. For example, the received difference value for a particular pixel may be provided as a lookup operation at the weighting table 534. A result of the lookup operation may determine whether the pixel value in the output image data 580 has a value from the first image data received from the coarse combination circuit 562, a value from the second received image data received from the coarse combination circuit 562, or a combination thereof.

The weighting table 534 may include data indicating a first weight to be applied to a pixel value of the first image data and a second weight to be applied to a pixel value of the second image data. The weighting table 534 may provide an output value "W" having a range of approximately 0 to 1 that corresponds to a weight to be applied to the first image data, and a value 1-W that correspond to a weight to be applied to the second image data. The weighting table 534 may be responsive to a table control signal 533 from the application specific control circuit 532.

During operation, the application specific control circuit 532 may determine one or more control parameters to control an image registration and combination process at the system 500. For example, the application specific control circuit 532 may select a value of the search range control signal 535 to indicate an aggressiveness of the macro block registration, the threshold control signal 537 to indicate an amount of acceptable difference for macroblock combination, the response control signal 539 to indicate a type of filtering to be performed, and the table control signal 533 to indicate how the images are to be combined based on a filtered pixel difference between the images.

For example, the application specific control circuit 532 may be configured to generate control signals specific to generating a HDR image. The search range control signal 535 may be set to indicate a very low or zero motion vector search range. The threshold control signal 537 may be set to indicate a very high threshold or to disable a block difference discrimination operation, so that all blocks are accepted. The response control signal 539 may be set such that the luma filter for the high exposure image is set to average everything else to zero at the filters 570 and 572. The table control signal 533 may be set to indicate a weighting function so that a pixel acceptance threshold is set moderately high to not add pixels having values far removed from the other pixels.

Although the system 500 is illustrated as including hardware circuits configured to perform specific processes, in other embodiments one or more components of the system 500 may be performed by a processor executing processor instructions. For example, one or more of the functions performed by the circuits 520, 522, 524, 526, 528, 530, 532, 534, 560, 562, 564, 566, 568, 570, 574, or 576 may be performed by an image processor, digital signal processor (DSP), or general purpose processor that has been programmed to perform one or more of the functions or general algorithms described above. In other embodiments, one or more of the circuits 520, 522, 524, 526, 528, 530, 532, 534, 560, 562, 564, 566, 568, 570, 574, or 576 may be replaced by components included in hardware, firmware, a processor executing computer readable instructions, or any combination thereof.

Similarly, in a particular embodiment, one or more the modules depicted in the systems of FIGS. 1-4 may be implemented as firmware, such as implemented by a controller or processor that is configured to operate as a special purpose controller or processor by executing instructions to perform particular functions or algorithms. In a particular embodiment, one or more of the modules depicted in the systems of FIGS. 1-4 may be implemented as hardware, such as by circuitry that is configured to manipulate and process data to perform particular functions or algorithms. For example, the circuitry may be part of an application specific integrated circuit (ASIC). In a particular embodiment, one or more of the modules depicted in the systems of FIGS. 1-4 may be implemented as processor instructions that are executed at processing logic, such as at one or more general purpose processor cores of a multi-core system. For example, the one or more modules may be implemented within a general purpose computer system while the computer system is executing image processing software.

Figure 6:
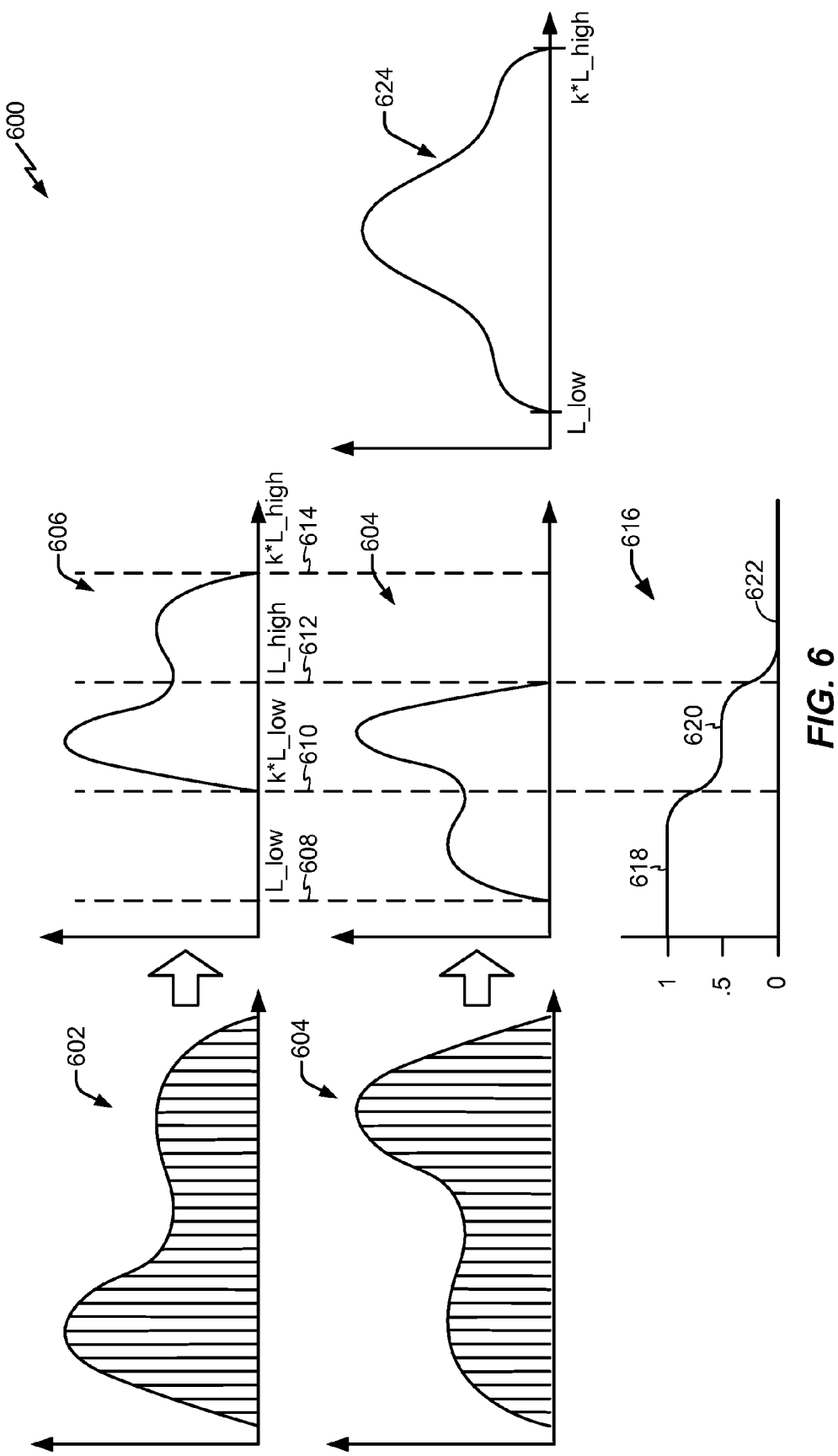
FIG. 6 is a general diagram of an illustrative embodiment of combining images to create a high dynamic range image.

Referring to FIG. 6, a particular embodiment of combining two low dynamic range images to generate a high dynamic range image is depicted and generally designated 600. First low dynamic range data is represented as a first histogram 602, and second dynamic range data is represented as a second histogram 604. In a particular embodiment, the first histogram 602 represents pixel luminance values of image data captured by a sensor, such as the sensor 108 of FIG. 1, having a first exposure condition, while the second histogram 604 represents luminance values of pixels of second image data, such as second image data captured by the image sensor 108 of FIG. 1 having a second exposure condition.

As illustrated in FIG. 6, the first histogram 602 shows a large number of pixels having low luminance values which may correspond to areas of darkness or shade that are underexposed using a shortened exposure time. In contrast, the second histogram 604 includes a large number of pixels having high luminance values, such as corresponding to overexposed bright areas of a longer exposure time image capture. In a particular embodiment, the first histogram 602 may correspond to the first image 160 of FIG. 1, and the second histogram 604 may correspond to the second image 162 of FIG. 1.

In a particular embodiment, the first histogram 602 may be scaled to a higher range of luminance values to compensate for an increased amount of exposure time of the second image to the first image. For example where the second image is captured using k times the exposure time as the first image, the luminance values of the pixels of the first image may be scaled (e.g., doubled when k is two), shifting the first histogram from a lowest value of L_low 608 and a highest value of L_high 612 to a lowest value of k*L_low 610 and a highest value of k*L_high 614, illustrated as a shifted histogram 606. L_low 608 may correspond to a light level that generates a sensor reading comparable or equal to a noise floor standard deviation of a sensor. L_high 612 may correspond to a light level that causes saturation of the sensor, less a black level luminance.

The scaled pixel values of the first image data, corresponding to the shifted histogram 606, may be combined with the pixel values of the second image data, corresponding to the unshifted second histogram 604, using a weighting function 616. The weighting function 616 may include a first value 618 in a luminance range less than k*L_low 610, a second value 620 in a second luminance range between k*L_low 610 and L_high 612, and a third value 622 in a third luminance range above L_high 612. For example, the weighting function 616 may include one or more sigmoid functions that smoothly transition between values across the range boundaries.

As illustrated, for pixels having a luminance value less than k*L_low 610, the weighting function 616 indicates a weight of "1," indicating that the pixel value of a corresponding pixel in a high dynamic range image is equal to the pixel value of the second image data. For pixels having a luminance value greater than L_high 612, the weighting function 616 indicates a weight of "0," indicating that the pixel value of a corresponding pixel in the high dynamic range image is equal to the pixel value of the first image data. For pixels having a luminance value between k*L_low 610 and L_high 612, where the scaled first image data and the second image data overlap, the weighting function 616 indicates a weight of "0.5," indicating that an average luminance value of the corresponding pixels in the scaled first image data and the second image data are averaged to determine the pixel luminance value in the high dynamic range output image. As illustrated, the weighting function 616 deviates from the behavior outlined above around k*L_low 610 and L_high 612 to smoothly transition between values.

A combined image may be described as:

$$S_{comb}=kS_T(1-C(S_{kT}))+S_{kT}(C(S_{kT}))$$

where $S_{comb}$ represents luminance of the combined image, k is the ratio of the longer exposure time to the shorter exposure time, $S_T$ represents luminance of the short exposure time image, C represents the weighting function, and $S_{kT}$ represents luminance of the longer exposure time image.

A distribution of pixel luminance values of the high dynamic range output image are indicated by a third histogram 624. The third histogram 624 illustrates that the pixel luminance values range from L_low to k*L_high with a dynamic range of k*L_high/L_low.

In a particular embodiment, the HDR combining illustrated in FIG. 6 may be performed by the HDR combining module 116 of FIG. 1, the system 200 of FIG. 2, or the system 500 of FIG. 5. Frame registration for HDR combining may be robust to non-linearities between the images due to saturation or level differences. The registration may not rely on finer motion vector estimation, may have substantially all pixels available for combining, and may combine based on a local image level.

For example, the application specific control circuit 532 of FIG. 5 may generate control signals specific to generating a HDR image. The search range control signal 535 may be set to indicate a very low or zero motion vector search range. The threshold control signal 537 may be set to indicate a very high threshold or to disable a block difference discrimination operation. The response control signal 539 may be set such that the luma filter for the high exposure image is set to average everything else to zero at the filters 570 and 572. The table control signal 533 may be set to indicate a weighting function such as the weighting function 616 of FIG. 6.

Figure 7:
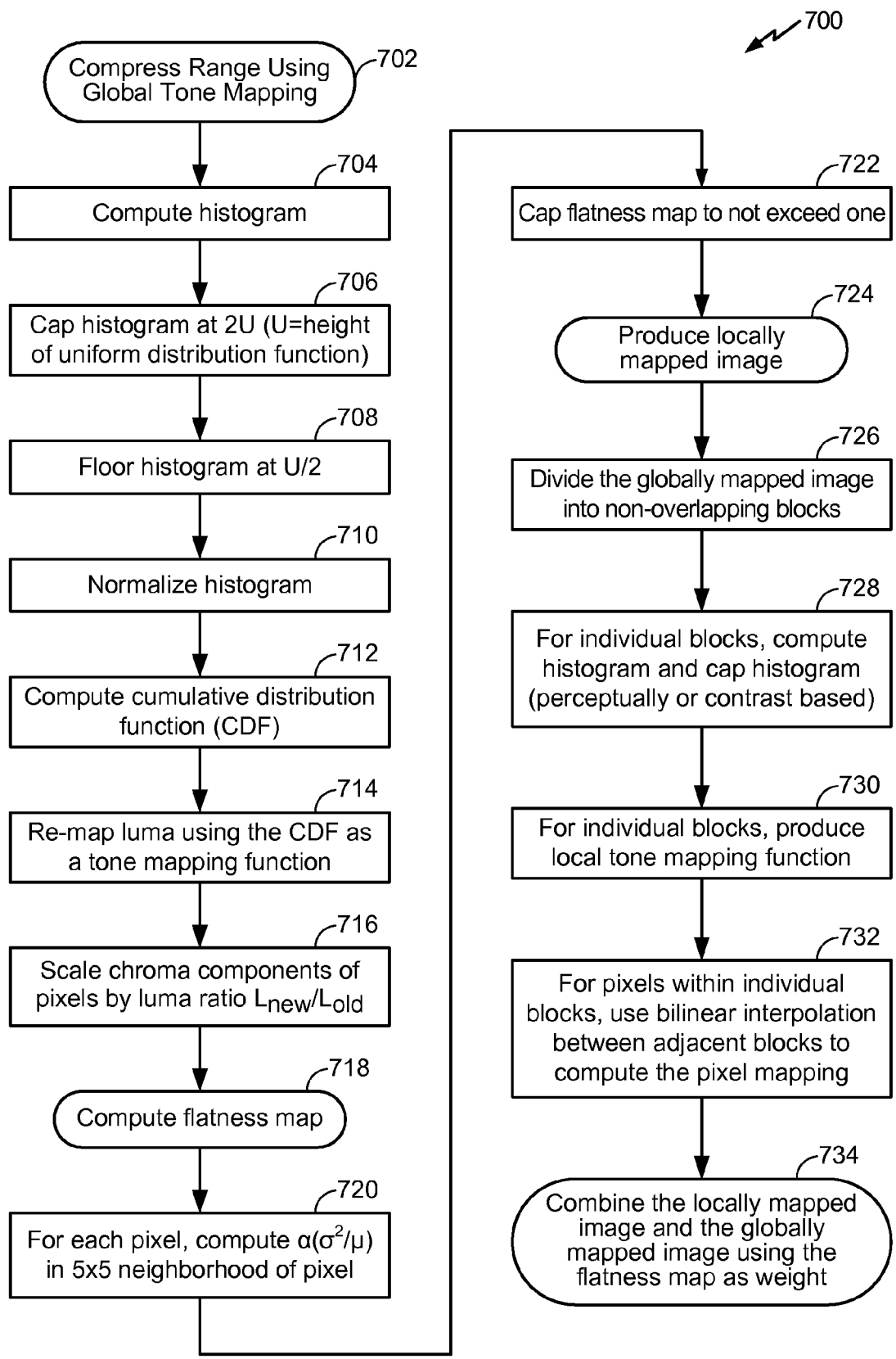
FIG. 7 is a flow diagram of an illustrative embodiment of a method of compressing high dynamic range image data.

FIG. 7 is a flow diagram of an illustrative embodiment of a method of compressing high dynamic range image data. In a particular embodiment, the method 700 or portions thereof may be performed by the HDR compression module 118 of FIG. 1, the system 300 of FIG. 3, the system 400 of FIG. 4, or the system 500 of FIG. 5, or any combination thereof. The method 700 includes performing the functions of compressing a dynamic range using global tone mapping, at 702, computing a flatness map, at 718, producing a locally mapped image, at 724, and combining the locally mapped image and the globally mapped image using the flatness map as weight, at 734.

In a particular embodiment, range compression using global tone mapping includes computing a histogram of pixel luminance values of high dynamic range image data, at 704. The histogram may be capped, at 706. For example, the histogram may be capped at 2 U, where U is a height of a uniform distribution of the pixel luminance values, to limit a contrast increase to a factor of two. A floor may also be applied to the histogram, at 708. For example, the floor may be U/2 to limit a contrast reduction to a factor of ½.

The resulting histogram may be normalized, at 710. For example, the histogram height may be reduced so that a total area of the histogram is substantially equal to one. A cumulative distribution function (CDF) may be computed, at 712. The CDF may represent a cumulative area under the normalized histogram as a function of luminance value, such that CDF(0)=0 and CDF(X)=1, where X is the largest luminance value having a non-zero histogram value.

The luma values of the high dynamic range image data may be re-mapped using the CDF as a tone mapping function, at 714. For example, the luma value of each pixel $L_{old}$ may be adjusted to a value $L_{new}$ using $L_{new}=L_{old}*CDF(L_{old})$. Chroma components of the pixels may also be scaled, at 716. For example, the chroma components, such as a blue-difference chroma component (Cb) and a red-difference chroma component (Cr), may be scaled by the luma ratio $L_{new}/L_{old}$.

In a particular embodiment, computing the flatness map 718 is performed using the global tone-mapped image data. A metric or measure of variation can be computed in a region of each pixel, at 720. For example, a value of $\alpha(\sigma^2/\mu)$ may be determined in a 5×5 pixel region for pixels that are away from borders of the images, where $\sigma$ represents a standard deviation, $\mu$ indicates a mean, and $\alpha$ may be a predetermined constant value. The flatness map may be capped so that no pixel flatness value exceeds a value of one, at 722.

In a particular embodiment, producing the locally mapped image 724 includes dividing the globally mapped image into non-overlapping blocks, at 726. A histogram may be computed and capped for individual blocks, at 728. For example, the histogram may be capped using a perception-based technique or a contrast-based technique. Local tone mapping may be produced for individual blocks, at 730. For example, the local tone mapping for individual blocks may use a similar technique as the global tone mapping 702 that is described at 704-716. For pixels within individual blocks, interpolation between adjacent blocks may be performed to compute the pixel mapping, at 732. For example, for every point in every block, bilinear interpolation may be used between adjacent mapping functions to compute the point's mapping.

The locally mapped image and the globally mapped image may be combined using the flatness map as weight, at 734. For example, each pixel value of the compressed output image data may be a weighted sum of the globally mapped image data and the locally mapped image data. The weight for the locally mapped image data may correspond to the flatness map value of the pixel (e.g., FM(i,j) for pixel at position i,j), and the weight for the globally mapped image data may correspond to 1-FM(i,j).

In a particular implementation, the method 700 controls a complexity of HDR compression to enable implementation in an image processing pipeline by image processing circuitry for mobile device applications. A continuity of the resulting image may be ensured, and no artifacts may be introduced.

Figure 8:
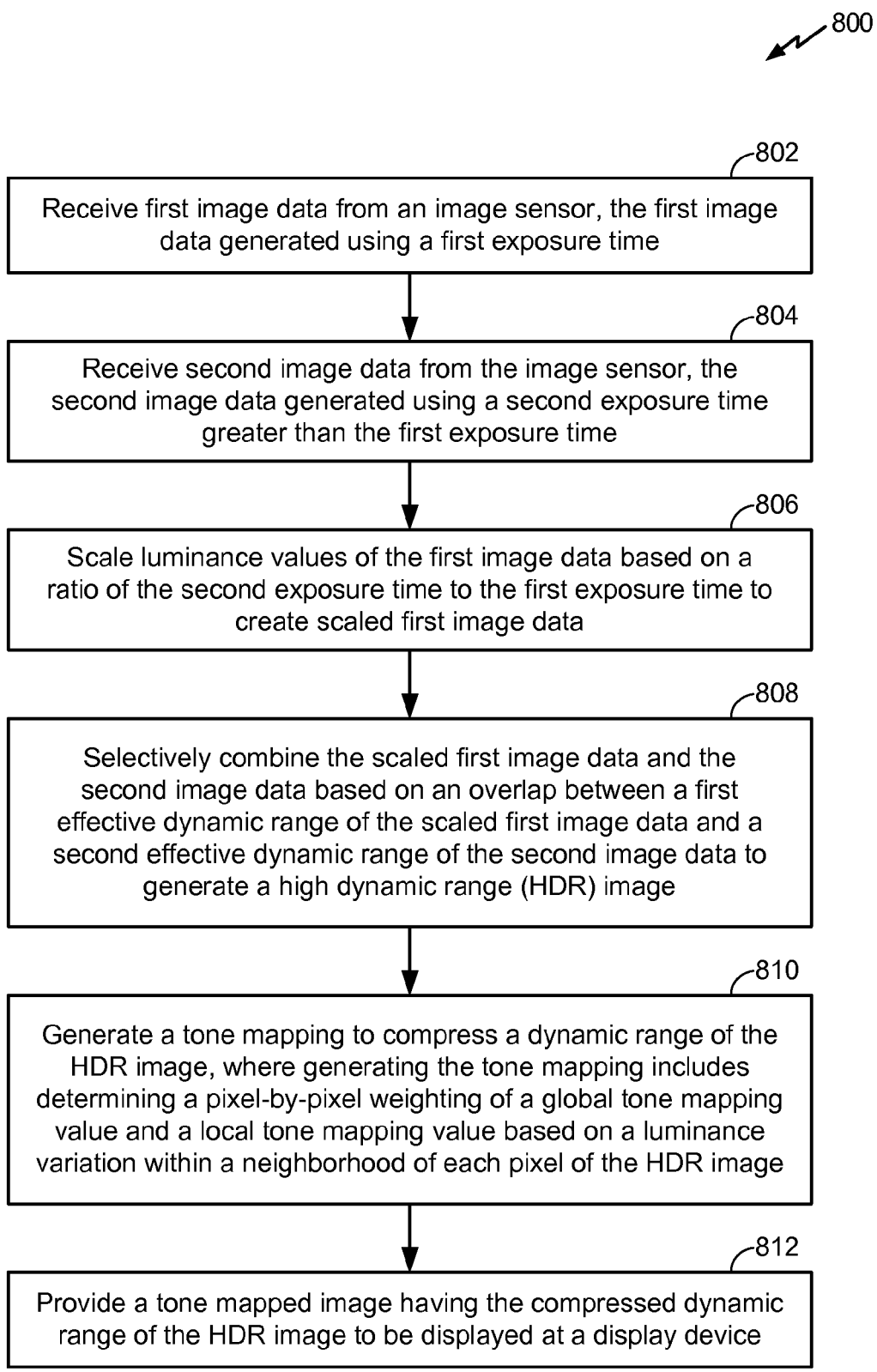
FIG. 8 is a flow diagram of a first illustrative embodiment of a method of high dynamic range image combining.

FIG. 8 is a flow diagram of a first illustrative embodiment of a method of high dynamic range image combining. In a particular embodiment, the method 800 is performed by any of the systems of FIG. 1-5, or any combination thereof First image data is received from an image sensor, at 802. The first image data is generated using a first exposure time. Continuing to 804, second image data is received from the image sensor. The second image data is generated using a second exposure time greater than the first exposure time.

Advancing to 806, luminance values of the first image data are scaled based on a ratio of the second exposure time to the first exposure time to create scaled first image data. Proceeding to 808, the scaled first image data and the second image data are selectively combined based on an overlap between a first effective dynamic range of the scaled first image data and a second effective dynamic range of the second image data to generate a high dynamic range (HDR) image. The first effective dynamic range may be determined based on a first saturation level, a first dark level, and a first noise floor of the first image data. The second effective dynamic range may be determined based on a second saturation level, a second dark level, and a second noise floor of the second image data. The scaled first image data and the second image data may be selectively combined using a first sigmoid function substantially centered at the first noise floor and a second sigmoid function substantially centered at the second saturation level minus the second dark level.

Moving to 810, a tone mapping is generated to compress a dynamic range of the HDR image. Generating the tone mapping includes determining a pixel-by-pixel weighting of a global tone mapping value and a local tone mapping value based on a luminance variation within a neighborhood of each pixel. For example, the compressed dynamic range may be an eight-bit range. Continuing to 812, a tone mapped image having the compressed dynamic range is provided to be displayed at a display device.

Figure 9:
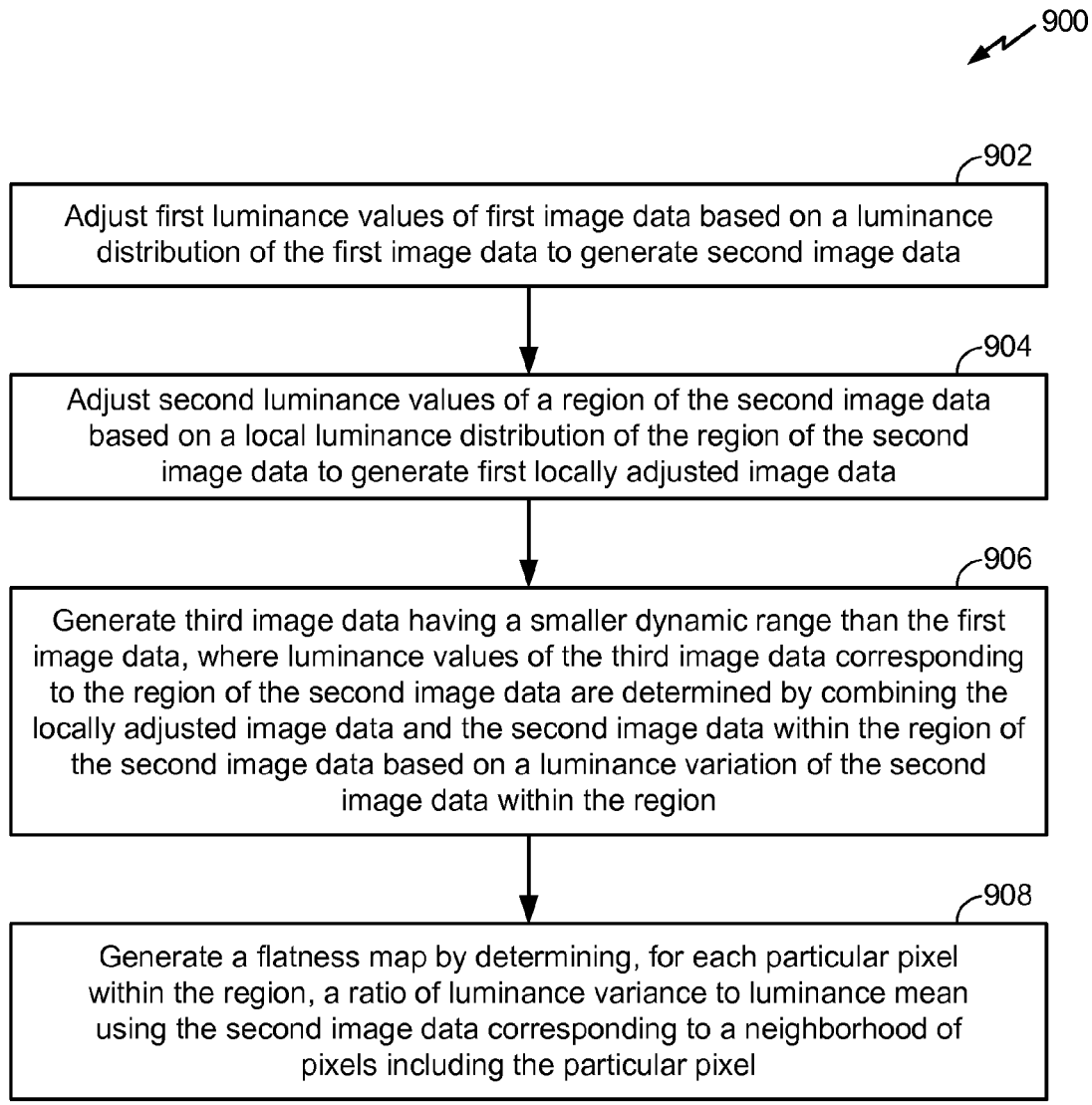
FIG. 9 is a flow diagram of a second illustrative embodiment of a method of high dynamic range image combining.

FIG. 9 is a flow diagram of a second illustrative embodiment of a method of high dynamic range image combining. In a particular embodiment, the method 900 is performed by any of the systems of FIG. 1-5, or any combination thereof.

First luminance values of first image data are adjusted based on a luminance distribution of the first image data to generate second image data, at 902. In a particular embodiment, adjusting the first luminance values includes determining a histogram of pixel luminance values of the first image data, capping a range of the histogram based on a uniform distribution level, normalizing the capped histogram, determining a cumulative distribution function (CDF) of the normalized histogram, and applying the CDF as a tone mapping function to remap the first luminance values.

Continuing to 904, second luminance values of a region of the second image data are adjusted based on a local luminance distribution of the region of the second image data to generate first locally adjusted image data. In a particular embodiment, adjusting the second luminance values includes dividing the second image data into multiple regions, computing a histogram of pixel luminance values of each of the multiple regions, determining a local tone mapping function corresponding to each of the multiple regions, and performing a bilinear interpolation between the local tone mapping functions corresponding to adjacent regions to compute a tone mapping of a particular pixel.

Advancing to 906, third image data is generated having a smaller dynamic range than the first image data. Luminance values of the third image data corresponding to the region of the second image data are determined by combining the locally adjusted image data and the second image data within the region of the second image data based on a luminance variation of the second image data within the region.

Moving to 908, a flatness map may be generated by determining, for each pixel within the region, a ratio of luminance variance to luminance mean using the second image data corresponding to a neighborhood of pixels including the particular pixel. The neighborhood of pixels may be smaller than the region of the second image data.

Figure 10:
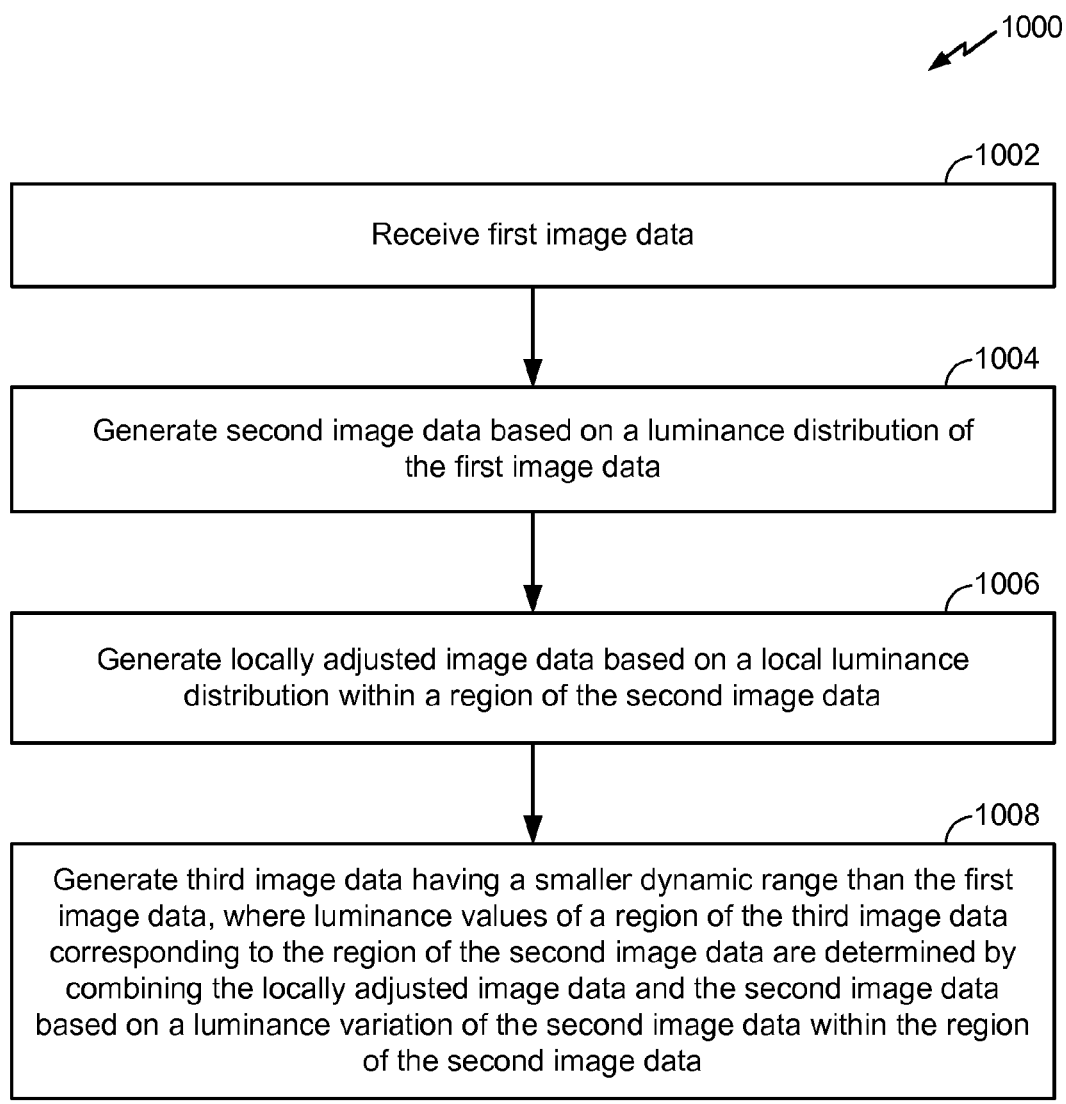
FIG. 10 is a flow diagram of a third illustrative embodiment of a method of high dynamic range image combining.

FIG. 10 is a flow diagram of a third illustrative embodiment of a method of high dynamic range image combining. In a particular embodiment, the method 1000 is performed by any of the systems of FIG. 1-5, or any combination thereof. For example, the method 1000 may be performed by a processor executing instructions that are stored at a computer readable medium, such as read-only memory (ROM), a random access memory (RAM), or other types of memory that may tangibly embody computer executable instructions.

First image data is received, at 1002. Proceeding to 1004, second image data is generated based on a luminance distribution of the first image data. Continuing to 1006, locally adjusted image data is generated based on a local luminance distribution within a region of the second image data.

Advancing to 1008, third image data is generated having a smaller dynamic range than the first image data. Luminance values of a region of the third image data corresponding to the region of the second image data are determined by combining the locally adjusted image data and the second image data based on a luminance variation of the second image data within the region of the second image data. Combining the locally adjusted image data and the second image data may include using a weighted sum of the locally adjusted image data and the second image data within the region. A weight of the weighted sum may be based on the luminance variation.

In a particular embodiment, a luminance value of a particular pixel within the region of the third image data is determined using a weighted sum of a first value of the second image data corresponding to the particular pixel and a second value of the locally adjusted image data corresponding to the particular pixel. The weighted sum may be computed based on pixel values within a neighborhood of the particular pixel. The pixel values within the neighborhood of the particular pixel may be determined from the second image data.

Figure 11:
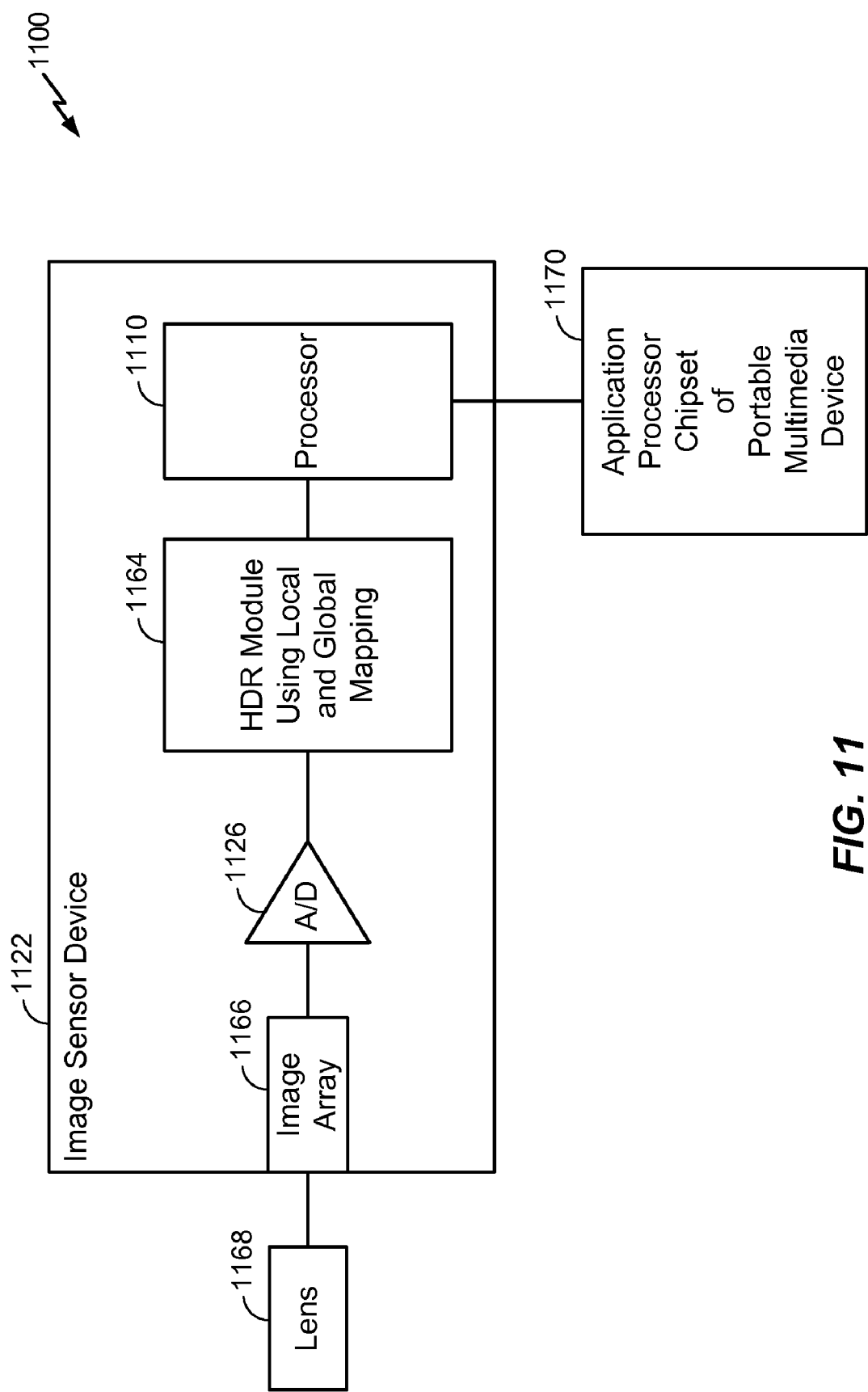
FIG. 11 is a block diagram of particular embodiment of a device including a high dynamic range combining module.

FIG. 11 is a block diagram of particular embodiment of a system including a high dynamic range (HDR) combining and compression module. The system 1100 includes an image sensor device 1122 that is coupled to a lens 1168 and also coupled to an application processor chipset of a portable multimedia device 1170. The image sensor device 1122 includes a HDR module using local and global mapping 1164 that may implement one or more of the modules or systems of FIGS. 1-5, may operate in accordance with any of the embodiments or methods of FIGS. 6-10, or any combination thereof.

The HDR module using local and global mapping 1164 is coupled to receive image data from an image array 1166, such as via an analog-to-digital convertor 1126 that is coupled to receive an output of the image array 1166 and to provide the image data to the HDR module using local and global mapping 1164. The HDR module using local and global mapping 1164 may generate HDR image data from multiple images captured at the image array 1166 to enable HDR functionality with an ordinary image array 1166. In addition, the HDR module using local and global mapping 1164 may compress the resulting image to be compatible with lower-resolution transport and storage mechanisms using a combination of both local and global tone mapping while ensuring continuity and without introducing artifacts.

For example, the HDR module using local and global mapping 1164 may include a global mapping module configured to generate first globally mapped luminance values within a region of an image, a local mapping module configured to generate second locally mapped luminance values within the region of the image, and a combination module configured to determine luminance values within a corresponding region of an output image using a weighted sum of the first globally mapped luminance values and the second locally mapped luminance values, such as the global tone mapping module 402, the local tone mapping module 404, and the combination module 408 of FIG. 4, respectively, or the global tone mapping module 302, the local tone mapping module 304, and the combination module 308 of FIG. 3, respectively. A weight of the weighted sum is at least partially based on a luminance variation within the region of the image For example, the weight may be determined on a pixel-by-pixel basis within the region.

The HDR module using local and global mapping 1164 may also include a variation module configured to generate a flatness map corresponding to a portion of the image, such as the variation module 406 of FIG. 4. The flatness map may indicate the luminance variation within the region of the image. The variation module may be configured to determine a luminance variance within a neighborhood of a particular pixel within the region. An entry of the flatness map corresponding to the particular pixel may be proportional to a ratio of the luminance variance within the neighborhood of the particular pixel to a luminance mean within the neighborhood of the particular pixel, such as described with respect to the output value 326 of FIG. 3.

The image sensor device 1122 may also include a processor 1110. In a particular embodiment, the processor 1110 is configured to implement the HDR module using local and global mapping 1164. For example, the processor 1110 may be configured to read instructions from a processor-readable medium and to execute the instructions to implement the HDR module 1164. In another embodiment, the HDR module using local and global mapping 1164 is implemented as image processing circuitry.

The processor 1110 may also be configured to perform additional image processing operations, such as one or more of the operations performed by the modules of FIG. 1. The processor 1110 may provide processed image data to the application processor chipset 1170 for further processing, transmission, storage, display, or any combination thereof.

Figure 12:
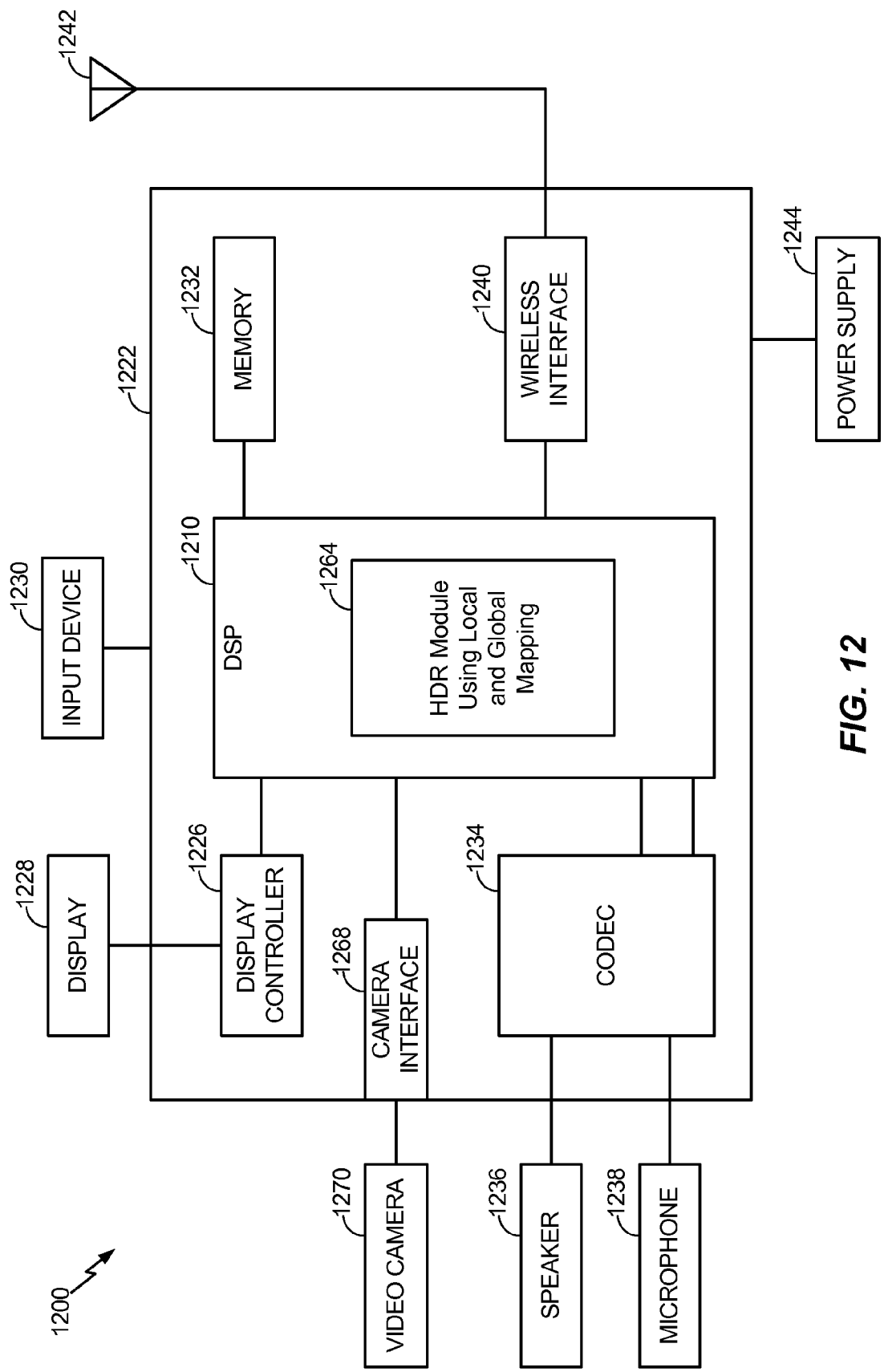
FIG. 12 is a block diagram of a wireless communication device including a high dynamic range combining module.

FIG. 12 is a block diagram of particular embodiment of a system including a HDR combining and compression module. The system 1200 may be implemented in a portable wireless electronic device and includes a processor 1210, such as a digital signal processor (DSP), coupled to a memory 1232. The system 1200 includes a HDR module using local and global mapping 1264. In an illustrative example, the HDR module using local and global mapping 1264 includes one or more of the modules or systems of FIGS. 1-5, or operates in accordance with any of the embodiments or methods of FIGS. 6-10, or any combination thereof. The HDR module using local and global mapping 1264 may be in the processor 1210 or may be a separate device.

A camera interface 1268 is coupled to the processor 1210 and also coupled to a camera, such as a video camera or still camera 1270. A display controller 1226 is coupled to the processor 1210 and to a display device 1228. A coder/decoder (CODEC) 1234 can also be coupled to the processor 1210. A speaker 1236 and a microphone 1238 can be coupled to the CODEC 1234. A wireless interface 1240 can be coupled to the processor 1210 and to a wireless antenna 1242.

In a particular embodiment, the processor 1210 includes the HDR module using local and global mapping 1264 and is adapted to generate HDR image data from multiple images captured by the camera 1270 to enable HDR functionality with an ordinary camera 1270. In addition, the HDR module using local and global mapping 1164 may compress the resulting image to be compatible with lower-resolution transport and storage mechanisms using a combination of both local and global tone mapping while ensuring continuity and without introducing artifacts.

The processor 1210 may also be adapted to generate and compress HDR image data from multiple sets of image data that may be received from various sources. For example, the image data may include video data or still images from the camera 1270, image data from a wireless transmission via the wireless interface 1240, or from other sources such as an external device coupled via a universal serial bus (USB) interface (not shown), as illustrative, non-limiting examples.

In a particular embodiment, the processor 1210 is configured to generate tone mapped image data including a tone mapped pixel value of each particular pixel of a plurality of pixels of image data based on a luminance variation within a neighborhood of the particular pixel, and to provide the tone mapped image data to display at the display device 1228. For example, the tone mapped data may be the output image data 328 of FIG. 3 or the output image data 424 of FIG. 4. In addition, the processor 1210 may be further configured to store the tone mapped image data at the memory 1232 or to provide the tone mapped image data to be communicated via the wireless interface 1240.

The image data may be high dynamic range (HDR) image data that is generated by combining a first set of image data received from the camera 1270 using a first exposure time and a second set of image data received from the camera 1270 using a second exposure time. The first and second set of image data may be sequentially captured at a single sensor of the camera 1270, or may be concurrently captured at multiple sensors of the camera 1270 using different exposure conditions. The luminance values of the first set of image data may be scaled based on a ratio of the second exposure time to the first exposure time and selectively combined with the second set of image data based on an overlap between a first effective dynamic range of the scaled luminance values and a second effective dynamic range of the second set of image data to generate the HDR image data, such as described with respect to FIG. 6. The processor 1210 may be further configured to process the HDR image data to generate a flatness map that indicates the luminance variation within the neighborhood of the particular pixel, and to determine the tone mapped pixel value of the particular pixel using a weighted sum of globally mapped image data and locally mapped image data. A weight of the weighted sum may be determined based on the luminance variation within the neighborhood of the particular pixel. For example, the processor 1210 may implement the variation module 306 of FIG. 3 or the variation module 406 of FIG. 4.

The display controller 1226 is configured to receive the processed image data and to provide the processed image data to the display device 1228. In addition, the memory 1232 may be configured to receive and to store the processed image data, and the wireless interface 1240 may be configured to receive the processed image data for transmission via the antenna 1242.

In a particular embodiment, the signal processor 1210, the display controller 1226, the memory 1232, the CODEC 1234, the wireless interface 1240, and the camera interface 1268 are included in a system-in-package or system-on-chip device 1222. In a particular embodiment, an input device 1230 and a power supply 1244 are coupled to the system-on-chip device 1222. Moreover, in a particular embodiment, as illustrated in FIG. 12, the display device 1228, the input device 1230, the speaker 1236, the microphone 1238, the wireless antenna 1242, the video camera 1270, and the power supply 1244 are external to the system-on-chip device 1222. However, each of the display device 1228, the input device 1230, the speaker 1236, the microphone 1238, the wireless antenna 1242, the video camera 1270, and the power supply 1244 can be coupled to a component of the system-on-chip device 1222, such as an interface or a controller.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable any person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

The invention claimed is:

1. A computer based method of storing a High Dynamic Range (HDR) image to an image storage, comprising:
    receiving first image data from an image sensor, the first image data generated using a first exposure time;
    receiving second image data from the image sensor, the second image data generated using a second exposure time that is greater than the first exposure time;
    scaling luminance values of the first image data based on a ratio of the second exposure time to the first exposure time to create scaled first image data;
    selectively combining the scaled first image data and the second image data based on an overlap between a first effective dynamic range of the scaled first image data and a second effective dynamic range of the second image data to generate a high dynamic range (HDR) image;
    generating a tone mapping, including determining a pixel-by-pixel weighting of a global tone mapping value and a local tone mapping value based on a luminance variation within a neighborhood of each pixel of the HDR image;
    generating a compressed dynamic range HDR image based, at least in part, on the tone mapping; and
    storing the compressed dynamic range HDR image to the image storage.

2. The method of claim 1, wherein the first effective dynamic range is determined based on a first saturation level, a first dark level, and a first noise floor of the first image data, and wherein the second effective dynamic range is determined based on a second saturation level, a second dark level, and a second noise floor of the second image data.

3. The method of claim 1, wherein the scaled first image data and the second image data are selectively combined based on a first sigmoid function substantially centered at the first noise floor and a second sigmoid function substantially centered at the second saturation level minus the second dark level.

4. The method of claim 1, wherein the tone mapping includes a weighted sum of the global tone mapping value and the local tone mapping value.

5. The method of claim 1, further comprising providing the compressed dynamic range HDR image to be displayed at a display device.

6. A computer based method of storing image data to an image storage, comprising:
   receiving first image data from an input device;
   adjusting first luminance values of first image data based on a luminance distribution of the first image data to generate second image data;
   adjusting second luminance values of a region of the second image data based on a local luminance distribution of the region of the second image data to generate locally adjusted image data;
   generating third image data having a smaller dynamic range than the first image data,
   wherein luminance values of the third image data corresponding to the region of the second image data are determined by combining the locally adjusted image data and the second image data within the region of the second image data based on a luminance variation of the second image data within the region; and
   storing the third image data to the image storage.

7. The method of claim 6, wherein adjusting the first luminance values comprises:
   determining a histogram of pixel luminance values of the first image data;
   capping a range of the histogram based on a uniform distribution level;
   normalizing the capped histogram;
   determining a cumulative distribution function (CDF) of the normalized histogram; and
   applying the CDF as a tone mapping function to the first image data to remap the first luminance values.

8. The method of claim 6, wherein adjusting the second luminance values comprises:
   dividing the second image data into multiple regions;
   computing a histogram of pixel luminance values of each of the multiple regions; determining a local tone mapping function corresponding to each of the multiple regions; and
   performing a bilinear interpolation between the local tone mapping functions to compute a tone mapping of a particular pixel of a particular region of the multiple regions, wherein the local tone mapping functions correspond to regions of the multiple regions that are adjacent to the particular region.

9. The method of claim 6, further comprising generating a flatness map by determining, for each particular pixel within the region, a ratio of luminance variance to luminance mean using the second image data corresponding to a neighborhood of pixels including the particular pixel.

10. The method of claim 6, wherein the third image data is generated to have at least a same amount of detail as the first image data.

11. The method of claim 6, wherein the locally adjusted image data and the second image data within the region of the second image data are combined using a weighted sum.

12. A wireless device comprising:
   a processor; and
   a memory accessible to the processor,
   wherein the processor is configured to:
      adjust first luminance values of first image data based on a luminance distribution of the first image data to generate second image data;
      adjust second luminance values of a region of the second image data based on a local luminance distribution of the region of the second image data to generate locally adjusted image data;
      generate third image data having a smaller dynamic range than the first image data, wherein luminance values of the third image data corresponding to the region of the second image data are determined by combining the locally adjusted image data and the second image data within the region of the second image data based on a luminance variation of the second image data within the region; and
   wherein the processor is configured to provide the third image data for display.

13. The wireless device of claim 12, wherein the processor is further configured to store the third image data at the memory.

14. The wireless device of claim 12, further comprising a wireless interface coupled to the processor, and wherein the processor is further configured to provide the third image data to be communicated via the wireless interface.

15. The wireless device of claim 12, wherein the first image data includes high dynamic range (HDR) image data.

16. The wireless device of claim 15, wherein the high dynamic range (HDR) image data is created by combining multiple exposures from a camera.

17. The wireless device of claim 16, wherein the processor is further configured to:
   process the HDR image data to generate a flatness map that indicates luminance variation within the neighborhood of a particular pixel; and
   determine a tone mapped pixel value of the particular pixel using a weighted sum of globally mapped image data and locally mapped image data, wherein a weight of the weighted sum is determined based on the luminance variation within the neighborhood of the particular pixel.

18. The wireless device of claim 12, further comprising a camera.

19. The wireless device of claim 12, further comprising a display device.

20. The wireless device of claim 12, wherein the generation of the third image combines the locally adjusted image data and the second image data within the region of the second image data using a weighted sum.

21. An apparatus comprising:
   means for generating tone mapped image data including a tone mapped pixel value of each particular pixel of a plurality of pixels of image data based on a luminance variation within a neighborhood of the particular pixel, the image data corresponding to an image captured at a camera, and adjusting first luminance values of first image data based on a luminance distribution of the first image data to generate second image data;
   means for adjusting second luminance values of a region of the second image data based on a local luminance distribution of the region of the second image data to generate locally adjusted image data;
   means for generating third image data having a smaller dynamic range than the first image data, wherein luminance values of the third image data corresponding to the region of the second image data are determined by combining the locally adjusted image data and the second image data within the region of the second image data based on a luminance variation of the second image data within the region; and means for providing the tone mapped third image data for display.

22. The apparatus of claim 21, further comprising means for wirelessly communicating the third image data.

23. The apparatus of claim 21, wherein the first image data includes high dynamic range (HDR) image data that is generated by combining a first set of image data received from the camera using a first exposure time and a second set of image data received from the camera using a second exposure time.

24. The apparatus of claim 21, wherein the means for generating third image data uses a weighted sum to combine the locally adjusted image data and the second image data within the region of the second image data.

25. A computer readable medium comprising executable instructions that, when executed, cause a processor to:
- receive first image data;
- generate second image data based on a luminance distribution of the first image data;
- generate locally adjusted image data based on a local luminance distribution within a region of the second image data; and
- generate third image data having a smaller dynamic range than the first image data, wherein luminance values of a region of the third image data corresponding to the region of the second image data are determined by combining the locally adjusted image data and the second image data based on a luminance variation of the second image data within the region of the second image data.

26. The computer readable medium of claim 25, wherein combining the locally adjusted image data and the second image data includes using a weighted sum of the locally adjusted image data and the second image data within the region, and wherein a weight of the weighted sum is based on the luminance variation.

27. The computer readable medium of claim 25, wherein a luminance value of a particular pixel within the region of the third image data is determined using a weighted sum of a first value of the second image data corresponding to the particular pixel and a second value of the locally adjusted image data corresponding to the particular pixel.

28. The computer readable medium of claim 25, wherein the instructions that cause a processor to generate third image data combine the locally adjusted image data and the second image data using a weighted sum.

29. A device comprising:
- a global mapping module configured to generate first globally mapped luminance values within a region of an image;
- a local mapping module configured to generate second locally mapped luminance values within the region of the image; and
- a combination module configured to determine luminance values within a corresponding region of an output image using a weighted sum of the first globally mapped luminance values and the second locally mapped luminance values, wherein a weight of the weighted sum is at least partially based on a luminance variation within the region of the image.

30. The device of claim 29, further comprising a variation module configured to generate a flatness map corresponding to a portion of the image, wherein the flatness map indicates the luminance variation within the region of the image.

31. The device of claim 30, wherein an entry of the flatness map corresponding to the particular pixel is proportional to a ratio of a luminance variance within a neighborhood of a particular pixel to a luminance mean within the neighborhood of the particular pixel.

* * * * *